US012497123B2

United States Patent
Zhang et al.

(10) Patent No.: US 12,497,123 B2
(45) Date of Patent: Dec. 16, 2025

(54) ELECTRIC VEHICLE

(71) Applicant: Shenzhen Chitado Technology CO., LTD, Guangdong (CN)

(72) Inventors: Dianxuan Zhang, Guangdong (CN);
Xingwei Fu, Guangdong (CN);
Haiyang Wang, Guangdong (CN);
Dengbing Zhou, Guangdong (CN);
Huihai Zeng, Guangdong (CN)

(73) Assignee: Shenzhen Chitado Technology CO., LTD (CN)

( * ) Notice: Subject to any disclaimer, the term of this patent is extended or adjusted under 35 U.S.C. 154(b) by 0 days.

(21) Appl. No.: 19/204,747

(22) Filed: May 12, 2025

(65) Prior Publication Data
US 2025/0269924 A1 Aug. 28, 2025

Related U.S. Application Data

(63) Continuation of application No. PCT/CN2023/134644, filed on Nov. 28, 2023.

(30) Foreign Application Priority Data

Jul. 10, 2023 (CN) .......................... 202310835372.5

(51) Int. Cl.
*B62K 11/00* (2006.01)
*B60L 15/20* (2006.01)
(Continued)

(52) U.S. Cl.
CPC ......... *B62K 11/007* (2016.11); *B60L 15/2036* (2013.01); *B60L 50/60* (2019.02);
(Continued)

(58) Field of Classification Search
CPC .... B62K 11/007; B60L 15/2036; B60L 50/60; B60L 2200/16; B60L 2200/24; B62J 45/413; B62D 11/04
See application file for complete search history.

(56) References Cited

U.S. PATENT DOCUMENTS

| 8,738,278 B2 * | 5/2014 | Chen | .................... B62K 11/007 |
| | | | 701/99 |
| 10,421,006 B1 * | 9/2019 | Li | ......................... A63C 17/002 |

(Continued)

FOREIGN PATENT DOCUMENTS

| CN | 205906129 U | 1/2017 |
| CN | 108298000 A | 7/2018 |

(Continued)

OTHER PUBLICATIONS

Application No. 202310835372.5 Applicant: Shenzhen Chitado Technology Co., Ltd. Invention Title: Electric Vehicle First office action notification was issued on Apr. 24, 2024, the response to the first office action was submitted on Aug. 24, 2024.

*Primary Examiner* — Valentin Neacsu
*Assistant Examiner* — Marlon A Arce
(74) *Attorney, Agent, or Firm* — IPro, PLLC; Na Xu

(57) ABSTRACT

Disclosed is an electric vehicle. The electric vehicle includes: a first foot platform, a second foot platform, a first wheel, a second wheel, a first tubular support shaft, a second tubular support shaft, a first sensor, a second sensor, at least one controller, a power source, an axial constraint mechanism, and a rotational constraint mechanism. The rotational constraint mechanism includes a first rotational constraint member disposed on the first foot platform and a second rotational constraint member disposed on the second foot platform, wherein the first rotational constraint member and the second rotational constraint member are configured to (Continued)

cooperate to limit a relative rotation angle between the first foot platform and the second foot platform.

18 Claims, 17 Drawing Sheets

(51) Int. Cl.
 *B60L 50/60* (2019.01)
 *B62J 45/413* (2020.01)
(52) U.S. Cl.
 CPC ......... *B62J 45/413* (2020.02); *B60L 2200/16* (2013.01); *B60L 2200/24* (2013.01)

(56) References Cited

U.S. PATENT DOCUMENTS

| | | | |
|---|---|---|---|
| 10,800,477 B2 * | 10/2020 | Shang | B62K 11/02 |
| 11,130,543 B2 * | 9/2021 | Ying | B62D 51/02 |
| 11,279,432 B2 * | 3/2022 | Chen | B62K 11/007 |
| 12,214,841 B2 * | 2/2025 | Desberg | B62J 45/413 |
| 12,227,257 B2 * | 2/2025 | Chen | B62K 11/007 |
| 2019/0077479 A1 | 3/2019 | Chen et al. | |
| 2023/0107027 A1 | 4/2023 | Bai | |

FOREIGN PATENT DOCUMENTS

| | | |
|---|---|---|
| CN | 210555353 U | 5/2020 |
| CN | 212447926 U | 2/2021 |
| CN | 212950979 U | 4/2021 |
| CN | 213292568 U | 5/2021 |
| CN | 108275230 A | 6/2021 |
| CN | 216916161 U | 7/2022 |
| CN | 116605337 A | 8/2023 |

\* cited by examiner

ELECTRIC VEHICLE

CROSS REFERENCE TO RELATED APPLICATIONS

This application claims the priority of a Chinese application with the application No. 202310835372.5 and the title of "Electric Vehicle", which was filed with the China National Intellectual Property Administration on Jul. 10, 2023. The entire disclosure of which is incorporated into herein by reference.

TECHNICAL FIELD

The present disclosure relates to the technical field of vehicles, and in particular, to an electric vehicle.

BACKGROUND

The statements herein merely provide background information related to the present disclosure and do not necessarily constitute prior art.

U.S. Pat. No. 8,738,278 B2 discloses a two-wheeled self-balancing electric vehicle device, which comprises: a first foot placement section and a second foot placement section interconnected and independently rotatable about an axis extending through a first wheel and a second wheel; the first wheel associated with the first foot placement section and the second wheel associated with the second foot placement section, wherein the first wheel and the second wheel are spaced apart and substantially parallel to each other; a first position sensor and a first drive motor configured to drive the first wheel; a second position sensor and a second drive motor configured to drive the second wheel; and control logic configured to drive the first wheel in response to position data from the first sensor to self-balance the first foot placement section and to drive the second wheel in response to position data from the second sensor to self-balance the second foot placement section.

This electric balancing vehicle technology represents an earlier scheme for a two-wheeled, rodless balancing vehicle. It primarily focuses on the theoretical principles of balance control. The inventors have observed that the structural design of the two-wheeled balancing vehicle, including the angle at which the first foot placement section and the second foot placement section may rotate relative to each other, may impact other structures or components of the balancing vehicle.

BRIEF SUMMARY OF THE DISCLOSURE

The present disclosure relates to the technical field of vehicles, and in particular, to an electric vehicle.

According to a first aspect of the present disclosure, the present disclosure provides an electric vehicle, including:
  a first foot platform configured to support one foot of a rider;
  a second foot platform configured to support the other foot of a rider, wherein the first foot platform is rotatable relative to the second foot platform;
  a first wheel connected to an outer side of the first foot platform and including a first motor;
  a second wheel connected to an outer side of the second foot platform and including a second motor, wherein the outer side of the first foot platform and the outer side of the second foot platform form opposite sides of the electric vehicle;
  a first tubular support shaft fixed to and extending within the first foot platform;
  a second tubular support shaft fixed to and extending within the second foot platform, wherein the first tubular support shaft is rotatably connected to the second tubular support shaft;
  a first sensor disposed on the first foot platform and configured to detect rotation of the first foot platform and generate a first sensing signal;
  a second sensor disposed on the second foot platform and configured to detect rotation of the second foot platform and generate a second sensing signal;
  at least one controller configured to control the first motor to drive the first wheel based on the first sensing signal, and to control the second motor to drive the second wheel based on the second sensing signal;
  a power source configured to supply power to the electric vehicle;
  an axial constraint mechanism including a first axial constraint member disposed on the first tubular support shaft and a second axial constraint member disposed on the second tubular support shaft, wherein the first axial constraint member and the second axial constraint member are configured to cooperate to restrict axial movement between the first tubular support shaft and the second tubular support shaft; and
  a rotational constraint mechanism including a first rotational constraint member disposed on the first foot platform and a second rotational constraint member disposed on the second foot platform, wherein the first rotational constraint member and the second rotational constraint member are configured to cooperate to limit a relative rotation angle between the first foot platform and the second foot platform.

According to a second aspect of the present disclosure, the present disclosure further provides an electric vehicle, including:
  a first foot platform configured to support one foot of a rider;
  a second foot platform configured to support the other foot of a rider;
  a first wheel connected to the first foot platform and including a first motor;
  a second wheel connected to the second foot platform and including a second motor;
  a first sensor disposed on the first foot platform and configured to detect rotation of the first foot platform and generate a first sensing signal;
  a second sensor disposed on the second foot platform and configured to detect rotation of the second foot platform and generate a second sensing signal;
  at least one controller configured to control the first motor to drive the first wheel based on the first sensing signal, and to control the second motor to drive the second wheel based on the second sensing signal;
  a power source configured to supply power to the electric vehicle;
  a first tubular support shaft;
  a second tubular support shaft;
  at least one hole formed on the first tubular support shaft; and
  at least one fastener fixed to the second tubular support shaft;
  wherein an inner end of the first tubular support shaft is rotatably inserted into an inner end of the second tubular support shaft to enable rotational connection between the first tubular support shaft and the second tubular support shaft; and the at least one fastener is configured to move within the at least one hole to at least limit a relative rotation angle between the first tubular support shaft and the second tubular support shaft.

According to a third aspect of the present disclosure, the present disclosure further provides an electric vehicle, including:

a first foot platform configured to support one foot of a rider;

a second foot platform configured to support the other foot of a rider;

a first wheel connected to the first foot platform and including a first motor;

a second wheel connected to the second foot platform and including a second motor;

a first sensor disposed on the first foot platform and configured to detect rotation of the first foot platform and generate a first sensing signal;

a second sensor disposed on the second foot platform and configured to detect rotation of the second foot platform and generate a second sensing signal;

a first controller disposed on the first foot platform and configured to control the first motor to drive the first wheel based on the first sensing signal;

a second controller disposed on the second foot platform and configured to control the second motor to drive the second wheel based on the second sensing signal;

a power source configured to supply power to the electric vehicle;

a first tubular support shaft;

a second tubular support shaft;

an arcuate groove formed on the first tubular support shaft; and a fastening bolt detachably fixed to the second tubular support shaft;

wherein an inner end of the first tubular support shaft is rotatably inserted into an inner end of the second tubular support shaft to enable rotational connection between the first tubular support shaft and the second tubular support shaft; and the fastening bolt is configured to move within the arcuate groove to limit a relative rotation angle between the first tubular support shaft and the second tubular support shaft.

DETAILED DESCRIPTION OF EMBODIMENTS

Figure 1:
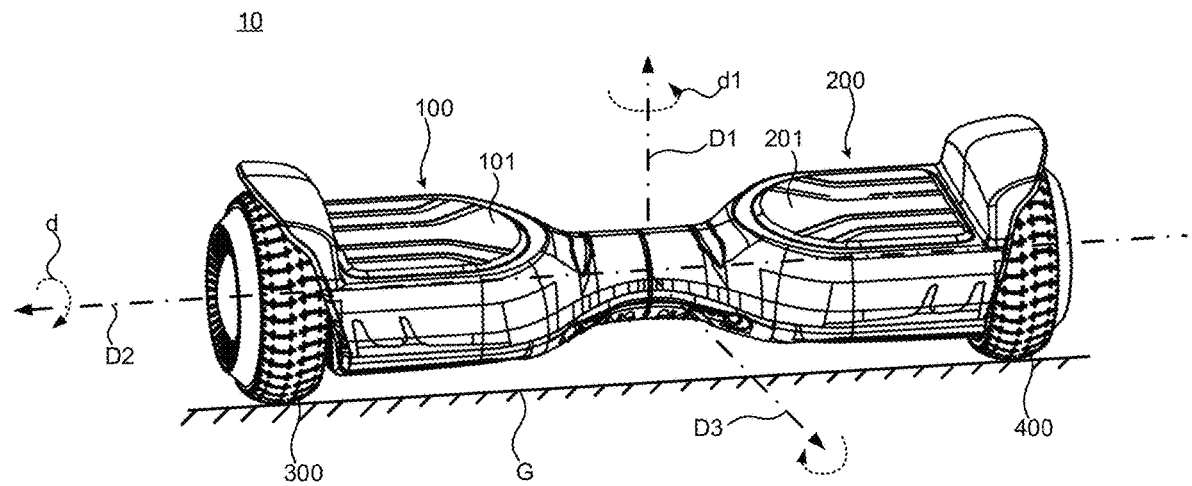
FIG. 1 is a schematic structural diagram of an electric vehicle according to an embodiment of the present application.

To make the objectives, features, and advantages of the present application more apparent and understandable, specific embodiments of the present application are described in detail below with reference to the accompanying drawings. In the following description, numerous specific details are set forth to provide a thorough understanding of the present application. However, the present application may be implemented in many alternative ways different from those described herein, and those skilled in the art may make similar improvements to achieve the same or similar functional effects without departing from the spirit of the present application. Therefore, the present application is not limited by the specific embodiments disclosed below.

In the description of the present application, it should be understood that terms such as "center," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," and "circumferential" indicate orientations or positional relationships as shown in the accompanying drawings. These terms are used solely for the convenience of describing the present application and simplifying the description, and do not indicate or imply that the referenced device or element must have a specific orientation, be constructed, or operate in a specific orientation. Accordingly, such terms should not be construed as limiting the present application.

Furthermore, the terms "first" and "second" are used for descriptive purposes only and should not be interpreted as indicating or implying relative importance or implicitly specifying the number of technical features indicated. Thus, a feature defined with "first" or "second" may explicitly or implicitly include at least one such feature. In the description of the present application, the term "plurality" means at least two, such as two, three, or more, unless explicitly and specifically limited otherwise.

Additionally, unless explicitly specified and limited otherwise, terms such as "mounted," "connected," "coupled," "fixed," "engaged," "disposed," and "positioned," which describe actions in the present application, should be interpreted broadly in light of the inventive concept of the present application. For example, such terms may be understood to encompass at least direct implementation, indirect implementation, fixed implementation, or movable implementation. Taking "coupled" as an embodiment, it may refer to direct coupling, indirect coupling through a third-party component, fixed coupling, or movable coupling, such as through a hinged connection. Similarly, "fixed" may be understood to include at least non-detachably fixed and detachably fixed implementations.

In the present application, unless explicitly specified and limited otherwise, descriptions such as "a first feature on or under a second feature" may mean that the first feature is in direct contact with the second feature, or that the first and second features are in indirect contact through an intermediate medium. Moreover, "a first feature above, over, or on top of a second feature" may mean that the first feature is directly above or obliquely above the second feature, or simply that the horizontal height of the first feature is greater than that of the second feature. Similarly, "a first feature below, under, or beneath a second feature" may mean that the first feature is directly below or obliquely below the second feature, or simply that the horizontal height of the first feature is less than that of the second feature.

Additionally, terms such as "vertical," "horizontal," "upper," "lower," "left," "right," and similar expressions used in the present application are for illustrative purposes only and do not indicate a sole implementation.

Figure 2:
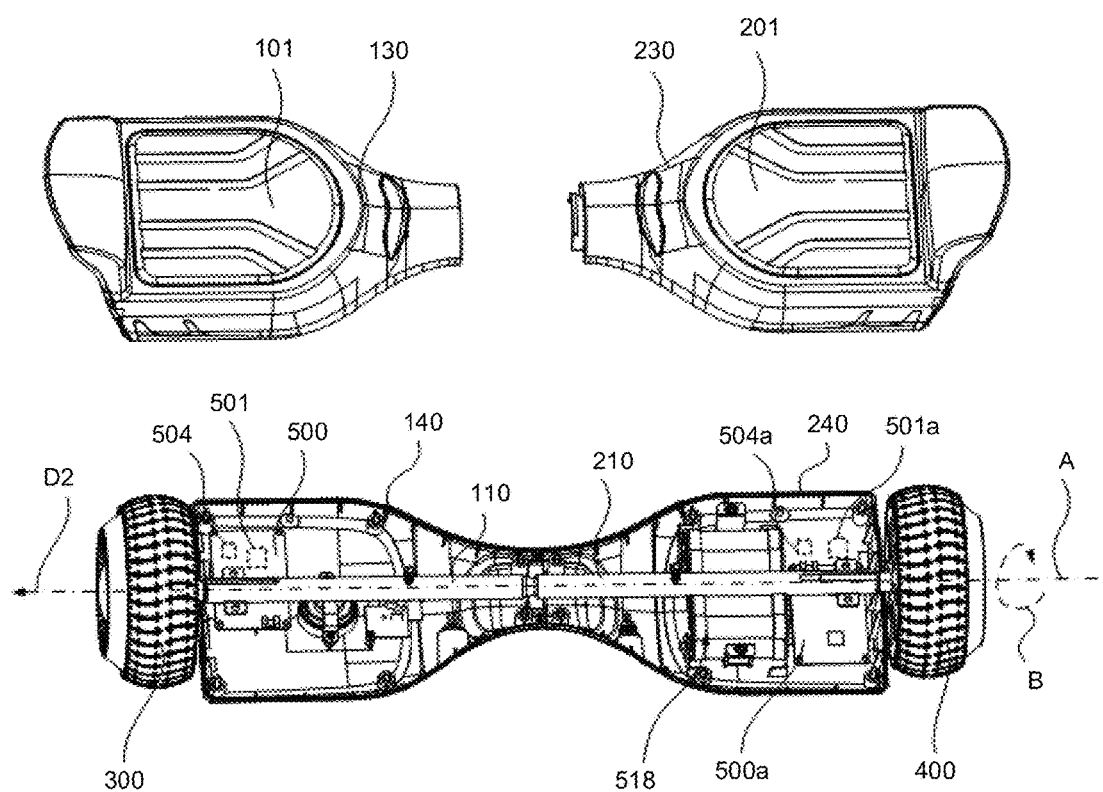
FIG. 2 is an exploded schematic diagram of one form of the electric vehicle according to an embodiment of the present application.

Referring to FIGS. 1 and 2, an embodiment of an electric vehicle 10 provided by the present application may, in some embodiments, be referred to as an electric balancing vehicle, an attitude vehicle, or a twist vehicle, as the electric vehicle 10 is designed and manufactured based on the principle of self-balancing. In some embodiments, whether the electric vehicle 10 is in motion with a rider or at rest without a rider, the electric vehicle 10 may maintain a self-balanced or stable state through a specific self-balancing control algorithm that adjusts the motor output torque of the electric vehicle 10 to sustain a balanced condition. This self-balancing characteristic significantly enhances the playability of the electric vehicle 10. Furthermore, this self-balancing characteristic includes at least dynamic balancing (e.g., maintaining balance while the electric vehicle 10 is in motion) and static balancing (e.g., maintaining balance when the electric vehicle 10 is stationary). Additionally, the self-balancing principle of the electric vehicle 10 may be substantially the same as or similar to the self-balancing technology and effects disclosed in U.S. Pat. No. U.S. RE46964E1. More specifically, this self-balancing principle refers to the capability of the electric vehicle 10 to self-balance during its use or motion.

In some embodiments, the electric vehicle 10 may include a first foot platform 100, a second foot platform 200, a first wheel 300, a second wheel 400, a first tubular support shaft 110, and a second tubular support shaft 210. The top of each of the first foot platform 100 and the second foot platform 200 may be configured to support a corresponding foot of the rider. In other words, the rider may stand on the first foot platform 100 and the second foot platform 200. More specifically, the rider's feet may respectively step on a substantially flat first top surface 101 defined by the first foot platform 100 and a substantially flat second top surface 201 defined by the second foot platform 200. That is, the first top surface 101 and the second top surface 201 are regions where the rider places their feet (e.g., left and right feet) to operate the electric vehicle 10. The first top surface 101 and the second top surface 201 may be at substantially the same height relative to the ground or may be substantially coplanar. Additionally, in the electric vehicle 10, the first wheel 300 may also be referred to as the right wheel, and the second wheel 400 may correspondingly be referred to as the left wheel, thereby defining a basic left-right orientation for the electric vehicle 10.

Figure 3:
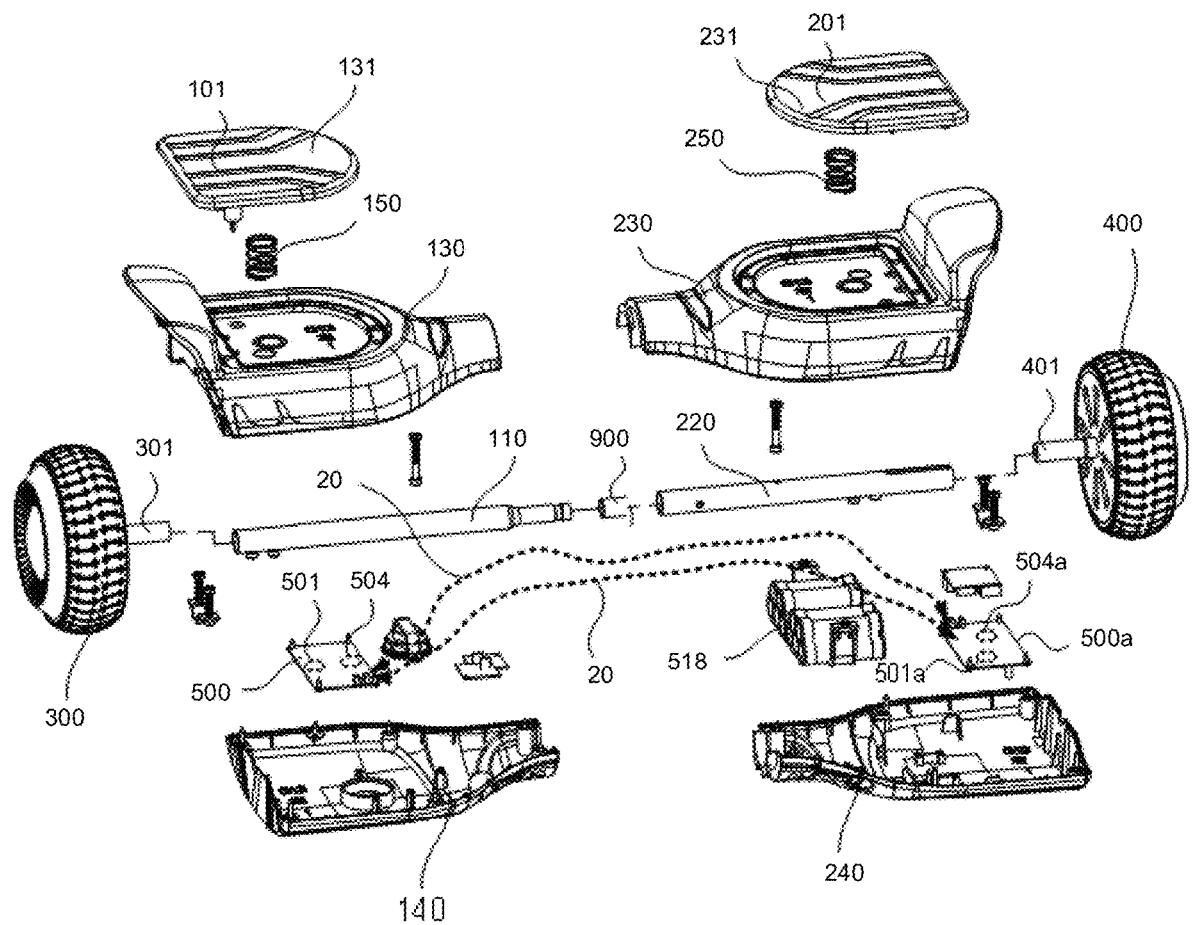
FIG. 3 is another exploded view of the electric vehicle according to an embodiment of the present application.

Further, referring to FIGS. 2 and 3, the first tubular support shaft 110 may be centrally fixed to the first foot platform 100 and extend within the first foot platform 100, while the second tubular support shaft 210 may be centrally fixed to the second foot platform 200 and extend within the second foot platform 200. Additionally, the first tubular support shaft 110 is rotatably coupled to the second tubular support shaft 210. Both of these tubular support shafts may be hollow, which helps reduce the overall weight of the electric vehicle 10.

Figure 4:
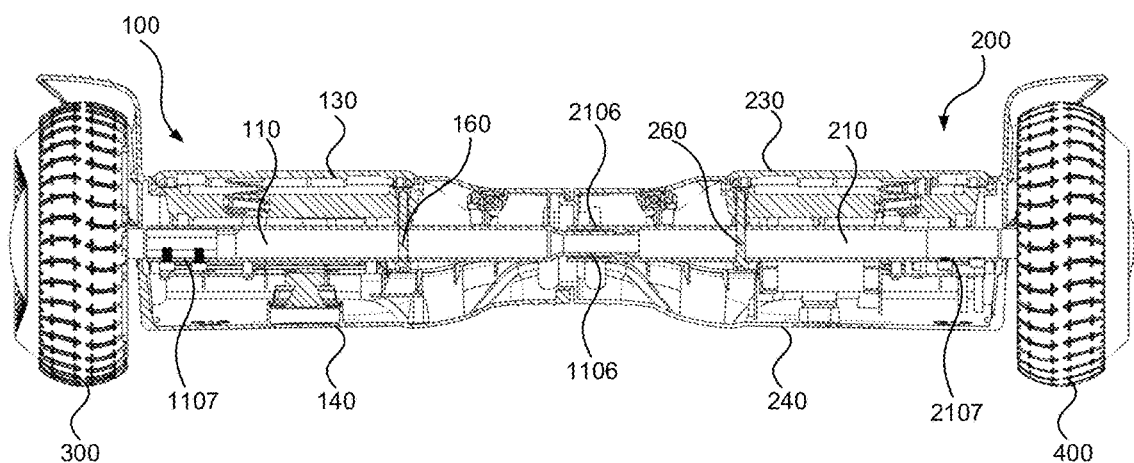
FIG. 4 is a cross-sectional view of the electric vehicle according to an embodiment of the present application.

Moreover, referring to FIG. 4, the first tubular support shaft 110 may have an inner end 1106 and an outer end 1107. The second tubular support shaft 210 may also have an inner end 2106 and an outer end 2107. The inner end 1106 of the first tubular support shaft 110 may be rotatably coupled to the inner end 2106 of the second tubular support shaft 210. This configuration enables an indirect rotational connection between the first foot platform 100 and the second foot platform 200. For example, when the rider applies different forces with their feet, the first foot platform 100 and the second foot platform 200 may rotate relative to each other, resulting in different tilted states or attitudes. Additionally, it may be seen that the outer end 1107 of the first tubular support shaft 110 is fixedly connected to the first wheel 300, and the outer end 2107 of the second tubular support shaft 210 is fixedly connected to the second wheel 400.

Furthermore, the first tubular support shaft 110 and the second tubular support shaft 210 may be coaxially mounted, as these two tubular support shafts may share a common central axis, which may also serve as the motor axis or the rotational axis for the two wheels of the electric vehicle 10. Additionally, the outer end 1107 of the first tubular support shaft 110 is connected to the first wheel 300, and the outer end 2107 of the second tubular support shaft 210 is connected to the second wheel 400.

In some embodiments, referring to FIGS. 2 to 4, the first tubular support shaft 110 and the second tubular support shaft 210 effectively form a support assembly. This support assembly serves as the primary load-bearing structure in the electric vehicle 10 (e.g., when the rider steps on it). For instance, the first tubular support shaft 110 and the second tubular support shaft 210 may be made of steel or iron, while the first foot platform 100 and the second foot platform 200 may be made of plastic. It should be noted that, in other embodiments, the shape of the two support shafts in the support assembly is not limited to being tubular; as long as the support shafts have a certain axial extension length (e.g., the axial direction may refer to the direction along the centerline connecting the left and right wheels), possess sufficient structural strength (e.g., made of steel), and are rotatably connected to each other, they are sufficient for the purpose.

Additionally, the first wheel 300 is connected to the outer side of the first foot platform 100 and includes a first motor, while the second wheel 400 is connected to the outer side of the second foot platform 200 and includes a second motor. In some embodiments, the first wheel 300 and the second wheel 400 may have substantially the same hardware configuration, with each wheel incorporating a corresponding drive motor therein. Therefore, in the field of electric vehicles, the first wheel 300 and the second wheel 400 may also be referred to as integrated hub motors or wheel assemblies.

In some embodiments, the first foot platform 100 and the second foot platform 200 may also be referred to as left and right frames, chassis, or left and right bodies, as the first foot platform 100 and the second foot platform 200 primarily define the overall configuration of the electric vehicle 10 while simultaneously providing support and mounting for other components or elements of the electric vehicle 10. Additionally, referring to FIGS. 1 to 3, the top surfaces of the first foot platform 100 and the second foot platform 200 are both substantially flat, which facilitates the rider's feet resting steadily on these platforms for stable operation of the electric vehicle 10. Furthermore, it may be observed that the first foot platform 100 and the second foot platform 200 may be designed to be substantially symmetrical, or the entire electric vehicle 10 may generally be designed with left-right symmetry.

Referring to FIG. 1, the electric vehicle 10 may have or define a yaw axis D1 (Yaw Axis), a pitch axis D2 (Pitch Axis), and a roll axis D3 (Roll Axis). The pitch axis D2 may be the axis about which the first wheel 300 and the second wheel 400 collectively rotate, or an axis parallel thereto. For example, the pitch axis D2 may coincide with the common central axis of the first tubular support shaft 110 and the second tubular support shaft 210. The roll axis D3 may be perpendicular to the pitch axis D2 and may generally extend in the direction in which the electric vehicle 10 may be propelled by the motor. For instance, the roll axis D3 may extend in the front-rear direction of the first foot platform 100 and the second foot platform 200. The yaw axis D1 may be perpendicular to both the pitch axis D2 and the roll axis D3. For example, the yaw axis D1 may be orthogonal to the substantially flat top surfaces of the first foot platform 100 and the second foot platform 200. Additionally, in some embodiments, arrows on these axes in the drawings may be used to indicate the positive and negative directions of the axes. Generally, an axis may be considered a straight line extending in two directions. Taking the pitch axis D2 as an embodiment, the arrow may indicate the positive direction of D2, while the direction opposite to the arrow indicates the negative direction of D2.

Moreover, these three axes may also define a basic orientation for the electric vehicle 10. For example, the direction of the arrow of D3 represents the front of the electric vehicle 10, while the opposite direction of the arrow of D3 represents the rear of the electric vehicle 10; the direction of the arrow of D2 represents the right side of the electric vehicle 10, while the opposite direction of the arrow of D2 represents the left side of the electric vehicle 10; the direction of the arrow of D1 represents the upper side of the electric vehicle 10, while the opposite direction of the arrow of D1 represents the lower side of the electric vehicle 10.

Additionally, the side of the electric vehicle 10 where the first wheel 300 is mounted may be referred to as the right side of the electric vehicle 10, and the side where the second wheel 400 is mounted may be referred to as the left side of the electric vehicle 10, meaning these two sides are opposite sides of the electric vehicle 10. The first wheel 300 and the second wheel 400 may be configured to rotate about the aforementioned pitch axis D2. Furthermore, the roll axis D3 may be located within the first top surface 101 or the second top surface 201. In some embodiments, the pitch axis D2 and the roll axis D3 may define a plane, such as a plane parallel to the horizontal ground.

In some embodiments, as shown in FIGS. 2 and 3, the electric vehicle 10 may include two control boards/circuit boards, namely a first control board 500 fixedly mounted in the first foot platform 100 and a second control board 500*a* fixedly mounted in the second foot platform 200. In some embodiments, the control boards may also be referred to as PCBA boards. Specifically, these two control boards may be fixedly mounted in the left and right foot platforms of the electric vehicle 10 using screws or bolts. Additionally, the first control board 500 and the second control board 500*a* may be communicatively connected via a cable (not shown) to facilitate the sharing or exchange of relevant data/signals between the first control board 500 and the second control board 500*a*, thereby collaboratively adjusting the rotational speed and torque of the left and right hub motors/wheels to at least maintain the dynamic stability/balance of the electric vehicle 10.

In some embodiments, the two control boards within the electric vehicle 10 may also be referred to as main controllers. Additionally, each of these two control boards of the electric vehicle 10 may be fixedly mounted with a microcontroller and corresponding sensors configured to detect the attitude of the foot platforms. In this manner, when the attitude, orientation, tilt state, or position of the foot platforms of the electric vehicle 10 changes, the attitude, orientation, tilt state, or position of the control boards, as well as the microcontrollers and sensors mounted thereon, undergoes a corresponding synchronous change.

Figure 5:
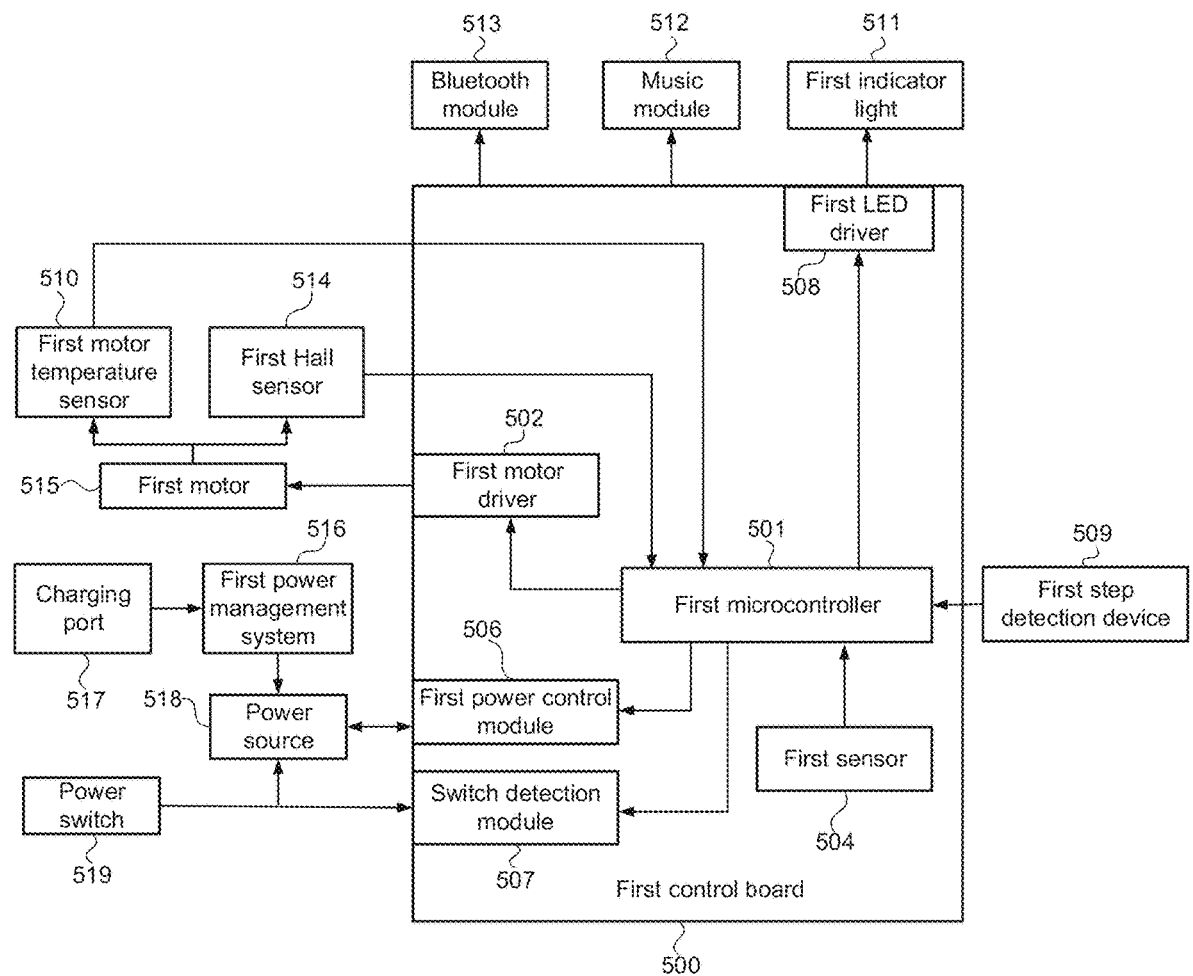
FIG. 5 is a schematic diagram illustrating the composition of a portion of the electrical components of the electric vehicle according to an embodiment of the present application.

Referring specifically to the embodiment in FIG. 5, various electrical components, including the first control board 500, of the electric vehicle 10 are illustrated. These electrical components are primarily distributed within the first foot platform 100 to support the implementation of related functions of the first foot platform 100, such as attitude data detection and motor driving for dynamic balancing purposes.

The one or more electrical components within the first foot platform 100 may include the first control board 500, a first microcontroller 501, a first sensor 504, a first step detection device 509, a power switch 519, switch detection module 507, a charging port 517, a first Hall sensor 514, a first motor 515, a first power management system 516, a Bluetooth module 513, a music module 512, and a first indicator light 511, among others.

The power source 518 may be disposed solely within the second foot platform 200. In such a configuration, the power source 518 may be connected to and supply power to the relevant electrical components within the first foot platform 100 via a cable. The power source 518 may comprise one or more rechargeable batteries, such as one or more lithium batteries that are relatively lightweight and have a relatively high power density. For example, the power source 518 may include one or more lithium iron phosphate batteries, one or more lithium polymer batteries, one or more lithium cobalt batteries, one or more lithium manganese batteries, or combinations thereof. In a specific embodiment, the power source 518 may include 16 A123 lithium iron phosphate batteries (e.g., model 26650). In other embodiments, the power source 518 may alternatively be disposed solely within the first foot platform 100.

The first microcontroller 501 and/or one or more first sensors (or at least one first sensor) 504 may be included in or mounted on the first control board 500, or coupled or connected to the first control board 500. The type of the first microcontroller 501 is not particularly limited. In other embodiments, the first microcontroller 501 may be replaced by devices such as a Complex Programmable Logic Device (CPLD), a Field-Programmable Gate Array (FPGA), or other electronic control circuits, or a suitable combination of such devices/electronic control circuits, to perform the control functions of the electric vehicle 10 in a similar manner. These control functions may specifically include, for example, receiving attitude data of the electric vehicle 10 sensed by relevant sensors and generating drive signals for the motors of the two wheels of the electric vehicle 10 based on the attitude data. Additionally, the English term for the first microcontroller 501 may be "Microcontroller Unit," abbreviated as MCU. Since a microcontroller integrates components such as an Arithmetic Logic Unit (ALU), memory, timers/counters, and various I/O circuits onto a single chip, forming a substantially complete computing system, it is also referred to as a Single Chip Microcomputer.

The first sensor 504 may be configured to measure attitude information, orientation information, tilt state, or position information of the first foot platform 100. For example, referring to FIG. 1, the first sensor 504 may be configured to sense movement or rotation of the first foot platform 100 about and/or along the pitch axis D2 (Pitch Axis), the roll axis D3 (Roll Axis), and/or the yaw axis D1 (Yaw Axis). The first motor 515 may be configured to cause rotation of the first wheel 300 based on the orientation/attitude of the first foot platform 100. Specifically, the first microcontroller 501 may be configured to receive orientation/attitude information of the first foot platform 100 measured by the first sensor 504 and, based on this orientation/attitude information, drive the motor within the first wheel 300 to generate rotational torque, thereby propelling the electric vehicle 10 and/or actively maintaining the balance of the electric vehicle 10.

The first foot platform 100 may include one or more first indicator lights 511 for illumination or to provide entertainment lighting effects, such as one or more headlamp and/or taillamp assemblies. The headlamp/taillamp assemblies may be configured to reversibly illuminate the electric vehicle 10. One or more of the headlamp/taillamp assemblies (e.g., their corresponding illuminators) may be connected to the first microcontroller 501 via a first LED driver 508. The first LED driver 508 may be included in or connected to the first control board 500. In some embodiments, the illuminators may include RGB/RGBW LED beads.

In some embodiments, the active balancing (also referred to as self-stabilization or self-balancing) state/mode of the first foot platform 100 of the electric vehicle 10 may be achieved through the use of a first feedback control loop or mechanism. The first feedback control loop or mechanism involves multiple components within the first foot platform 100, including, for example, hardware modules such as the first sensor 504 and the first microcontroller 501 (MCU), as well as firmware modules or other related software modules for executing feedback control algorithms or self-balancing algorithms. The feedback control loop or mechanism may be implemented in one or more electrical components.

Within the first foot platform 100, the first feedback control mechanism may include the first sensor 504, which may be fixedly mounted to the first control board 500. The type of the first sensor 504 is not particularly limited, as long as it may be used to measure changes in the attitude, orientation, tilt state, or position of the first foot platform 100. Typically, the first sensor 504 is an Inertial Measurement Unit (IMU). More specifically, the first sensor 504 is generally a six-axis gyroscope, which may internally integrate a three-axis gyroscope sensor (referred to as a gyroscope) and a three-axis accelerometer sensor (referred to as an accelerometer).

The aforementioned gyroscope and accelerometer may be collectively configured to estimate (or measure or sense) the tilt angle of the first foot platform 100, such as the tilt angles of the first foot platform 100 relative to the pitch axis D2, the roll axis D3, and the yaw axis D1. Here, the tilt angle of the first foot platform 100 may be understood as a specific manifestation of the attitude information or position information of the first foot platform 100. For example, rotation of the first foot platform 100 about the pitch axis, roll axis, and/or yaw axis generates corresponding tilt angles, where rotation about the pitch axis D2 corresponds to a pitch angle, rotation about the roll axis D3 corresponds to a roll angle, and pivoting about the yaw axis D1 corresponds to a yaw angle.

As described above, the orientation/attitude information of the first foot platform 100 may be measured (or sensed) by the gyroscope and accelerometer within the first sensor 504. Specifically, the gyroscope may measure and output angular velocity data regarding the rotation of the first foot platform 100, for example, about the pitch axis D2, while the accelerometer may measure and output acceleration data regarding the rotation of the first foot platform 100, for example, about the pitch axis D2. Subsequently, the feedback control mechanism may use a complementary filter (Complementary Filter) or a Kalman filter (Kalman Filter) to perform data fusion on the two types of measurement data (or sensed signals) from the gyroscope and accelerometer, while filtering out effects such as collisions, road texture, data drift, high- and low-frequency noise, and disturbances due to steering inputs. This enables a high-precision estimation/measurement of the tilt angle of the first foot platform 100 about/relative to the pitch axis D2, which may be used as the attitude data of the first foot platform 100. In other embodiments, the attitude data of the first foot platform 100 may further include directional data of the first foot platform 100 measured by a magnetometer.

In some embodiments, the first foot platform 100 of the electric vehicle 10 may include any sensors and feedback control loops configured for self-stabilization/self-balancing vehicles. Optionally, the feedback control loop may include a PID controller (Proportional-Integral-Derivative), also referred to as a PID control loop, which may be a software module or firmware within the first microcontroller 501. In some embodiments, the basic principle of the feedback control loop, including the PID controller, may be as follows: when a rider steps on the electric vehicle 10, the force exerted by one of the rider's feet causes a change in the current attitude (e.g., a horizontal orientation) of the first foot platform 100, such as generating a tilt angle θ. The first microcontroller 501 may, in response to the detected tilt angle θ, calculate a desired rotational speed accordingly. The first motor 515 then executes or outputs this desired rotational speed to drive the first wheel 300 to rotate about the pitch axis D2, thereby causing the vehicle to move. Simultaneously, the first microcontroller 501 may also, in response to the same detected tilt angle θ, control the first motor 515 to generate a force that maintains the balance or stability of the first foot platform 100 at the current tilt angle θ. Furthermore, this force generated by the motor may be considered as counteracting the tilt imposed on the first foot platform 100 by the rider, attempting to restore the first foot platform 100 from its current tilted state to its original state (e.g., a horizontal orientation).

It should be noted that the aforementioned desired rotational speed is an ideal speed calculated by the first microcontroller 501 based on the measured tilt angle. However, due to various factors (e.g., signal loss, signal drift, high- and low-frequency noise, etc.), the hub motor may not perfectly execute this ideal speed. Therefore, the feedback control loop continuously monitors (e.g., using an encoder/Hall sensor) the actual rotational speed of the hub motor within the first wheel 300 and feeds this information back to the first microcontroller 501 or the PID controller. The PID controller then compares the actual rotational speed with the desired rotational speed and calculates an adjusted control signal based on the error/difference between the two. This adjusted control signal is transmitted back to the first motor driver 502 via a PWM signal. Upon receiving the PWM signal, the first motor driver 502 outputs a corresponding current to the motor within the first wheel 300 based on parameters such as the duty cycle and frequency of the PWM signal, thereby adjusting the motor's rotational speed. This enables the electric vehicle 10 or the first foot platform 100 to achieve balance and stability. Through this feedback control approach, the PID controller may continuously adjust the rotational speed of the first motor 515 within the first wheel 300 to approach the desired rotational speed, while ensuring that the electric vehicle 10 or the first foot platform 100 remains stable/balanced under various conditions.

Additionally, the aforementioned feedback control loop may be implemented in other ways. Below are some common feedback control methods:

For example, Model Predictive Control (MPC): Model Predictive Control is a model-based optimization method that optimizes the controller's output by predicting the system's behavior over a future time period. MPC is suitable for multivariable, constrained complex systems, but has high computational complexity.

Another embodiment is Adaptive Control: Adaptive Control is a method that automatically adjusts the controller parameters during the control process based on changes in system parameters. Adaptive Control is suitable for systems with uncertainty and time-varying characteristics.

Another embodiment is Fuzzy Control: Fuzzy Control is a control method based on fuzzy logic, which processes input variables through fuzzy reasoning to obtain the controller's output. Fuzzy Control is suitable for systems where it is difficult to establish a precise mathematical model.

Another embodiment is Neural Network Control: Neural Network Control is a control method based on artificial neural networks. Neural networks may learn the input-output relationships of a system through training, thereby enabling control of the system. Neural Network Control is suitable for nonlinear, high-dimensional complex systems.

Each of these feedback control methods has its own applicable scenarios, advantages, and disadvantages. In practical applications, an appropriate control strategy may be selected based on the system characteristics and requirements of the electric vehicle 10. In some cases, multiple control methods may be combined to achieve better control performance.

In some embodiments, the process by which the aforementioned feedback control loop drives the first motor 515 within the first wheel 300 is as follows: for instance, as shown in FIG. 1, if the electric vehicle 10 is placed on a horizontal ground surface G, the rider's foot may step on the first top surface 101, causing the first foot platform 100 to tilt forward. At this point, the rider's body posture also tilts forward, where "forward" may refer to the direction of the arrow of the roll axis D3. Alternatively, the rider may cause the first foot platform 100 to rotate clockwise about the pitch axis D2 (this clockwise direction may, for example, be the direction d shown in FIG. 1). In this case, the feedback control loop may drive the first motor 515 to output a torque that causes the first wheel 300 to rotate clockwise about the pitch axis D2, thereby allowing the vehicle to move. This torque may also provide a counterclockwise force along the pitch axis D2 (opposite to direction d) to the first foot platform 100, which supports the first foot platform 100 and substantially counteracts the tilt imposed on the first foot platform 100 by the rider. In other words, this counterclockwise force is directly opposite to the tilting direction of the rider or the foot platform, thereby resisting the shift/tilt of the rider's center of gravity. This enables the first foot platform 100 and/or the rider on the first foot platform 100 to remain in a stable or balanced state.

Thus, the electric vehicle 10 or the first foot platform 100 may be set in motion by the rider leaning their weight forward. Similarly, deceleration may be achieved by the rider leaning backward, and sustained reverse operation may be achieved by the rider maintaining a backward lean. Here, the rider leaning forward may be more specifically understood as the rider tilting their own weight toward their toes, while leaning backward refers to the rider tilting their weight toward their heels.

In some embodiments, the first motor driver 502 may be a BLDC (Brushless DC) motor drive logic unit. The first microcontroller 501 may be configured to send signals to the BLDC drive logic unit, which may convey information regarding the orientation (attitude) and motion of the first foot platform 100. The BLDC drive logic unit may then interpret the signal to drive the first motor 515 accordingly. Additionally, the first Hall sensor 514 may send signals to the first microcontroller 501 or the BLDC drive logic unit to provide feedback on the substantially real-time rotational speed of the rotor of the first motor 515. Furthermore, a first motor temperature sensor 510 may be configured to measure the temperature of the first motor 515 and transmit the measured temperature to the first microcontroller 501. The first microcontroller 501 may limit the amount of power supplied to the first motor 515 based on the measured temperature of the first motor 515 to prevent overheating of the first motor 515.

In some embodiments, once the rider has appropriately positioned/placed one of their feet on the first foot platform 100, the aforementioned feedback control loop or the first microcontroller 501 may be configured to remain inactive until the rider moves the first foot platform 100 to a predetermined orientation or angle. For instance, a relevant algorithm may be incorporated into the feedback control loop or the first microcontroller 501, such that the control loop or the first microcontroller 501 remains inactive (e.g., does not drive the motor) until the rider uses their own weight to adjust the first foot platform 100 (or the first top surface 101) to approximately a predetermined horizontal orientation (e.g., a 0-degree pitch angle, where the first top surface 101 is parallel to the horizontal ground G). Once this predetermined orientation is detected, the feedback control loop may be enabled (or activated) to allow the electric vehicle 10 or the first foot platform 100 to enter a self-balancing state/mode and facilitate the transition of the electric vehicle 10 or the first foot platform 100 from a stationary mode (or configuration, state, or orientation) to a moving mode (or configuration, state, or orientation).

In some embodiments, the electric vehicle 10 or the first foot platform 100 may also automatically enter a preset balanced state upon startup (e.g., once powered on, the first top surface 101 of the first foot platform 100 may remain parallel to the horizontal ground G). This is referred to as a power-on self-balancing mode, which enables the vehicle body to remain upright, stable, or balanced even without a rider standing on it. In this power-on self-balancing mode, the electric vehicle 10 or the first foot platform 100 immediately enters a balanced state after startup, allowing the user to observe the vehicle's stability before boarding. This may enhance the user's confidence and improve the riding experience.

In some embodiments, referring back to FIG. 5, the first power management system 516 may be configured as a battery management system designed to protect the battery of the power source 518 from overcharging, over-discharging, and/or short-circuiting. The first power management system 516 may monitor the health status of the battery, track the state of charge of the battery within the power source 518, and/or enhance the safety of the electric vehicle 10. The first power management system 516 may be connected between the charging port 517 and the power source 518. A rider (or another user) may connect a charger to the charging port 517 and recharge the power source 518 via the first power management system 516.

In some embodiments, the first power control module 506 may primarily include a DC converter (DC-DC Converter), which is responsible for converting the DC voltage from the power source 518 into other required DC voltages. For instance, the battery of the power source 518 may output a voltage of 36V, but certain electronic components on the vehicle may require voltages of 12V or 5V. The DC converter may convert the battery's output voltage into these different voltage levels. Common types of DC converters include boost converters, buck converters, and buck-boost converters. Additionally, the first power control module 506 may further include a voltage regulator (Voltage Regulator), which is configured to maintain the stability of the output voltage of the power source 518, preventing voltage fluctuations from damaging the electronic components of the electric vehicle 10. The voltage regulator may be a linear voltage regulator (Linear Voltage Regulator) or a switching voltage regulator (Switching Voltage Regulator).

In operation, the power switch 519 may be activated (e.g., by the rider), and the activation of the power switch 519 may send a power-on signal to the first power control module 506. In response to the power-on signal, the first power control module 506 may convert the DC power from a first voltage level provided by the power source 518 to one or more other voltage levels. These other voltage levels may differ from the first voltage level. The first power control module 506 may be connected to other electrical components via one or more electrical connections to supply appropriate voltages to these components. The first power control module 506 (or another suitable circuit) may transmit the power-on signal to the first microcontroller 501. In response to the power-on signal, the first microcontroller 501 may initialize components such as the first sensor 504 and the first step detection device 509.

Additionally, the switch detection module 507 can be activated (e.g., through operation by the rider). Upon activation, the switch detection module 507 may transmit a signal to the first microcontroller 501. In response to the switch detection signal, the first microcontroller 501 can determine the status of the switch and implement corresponding control measures.

In the electric vehicle 10 or the first foot platform 100, when the first microcontroller (first MCU) 501 responds to the power-on signal, the process of initializing sensors (e.g., gyroscopes) and the step detection device may include the following steps:

First, power activation: When the power source 518 is activated/turned on, the first power control module 506 may provide a stable operating voltage to the first microcontroller 501, the first sensor 504, and other related electronic/electrical components. At this stage, the first foot platform 100, after being connected to the power source 518, is in a standby state but has not yet started. Starting the first foot platform 100 or the first motor requires specific actions, such as stepping onto the first top surface 101 or pressing a related button. Next, reset and startup: Upon power-up, the first microcontroller 501 performs a reset operation to ensure that most registers and memory units are in a known initial state. Thereafter, the first microcontroller 501 begins executing pre-programmed startup code/instructions. Then, hardware interface configuration: The first microcontroller 501 configures hardware interfaces for electrical components such as the first sensor 504 and the first step detection device 509, such as I2C, SPI, or UART serial communication interfaces. These interfaces enable communication between the first microcontroller 501 and external devices (e.g., the first sensor). Next, sensor calibration: For sensors such as the gyroscope within the first sensor 504, calibration is required before use to eliminate errors such as drift and noise. During the initialization process, the first microcontroller 501 calibrates the sensors to ensure the accuracy and reliability of their output data. Then, activation of step detection: When the electric vehicle 10 or the first foot platform 100 starts, the first step detection device 509 needs to be activated to detect whether a user/rider has stepped onto the electric vehicle 10 or the first foot platform 100. During the initialization process, the first microcontroller 501 activates the first step detection device 509, placing it in a standby state. Finally, activation of the corresponding self-balancing control algorithm: Once the first sensor 504 and the first step detection device 509 are initialized, the first microcontroller 501 may activate pre-programmed control algorithms (e.g., PID control, neural network control, etc.) to achieve dynamic balancing and motion control of the electric vehicle 10 or the first foot platform 100.

In some embodiments, the first foot platform 100 of the electric vehicle 10 may include one or more safety mechanisms, such as the power switch 519 and/or the first step detection device 509, to ensure that one of the rider's feet is indeed positioned on the first top surface 101 before engaging the feedback control loop. In some embodiments, the first step detection device 509 may be configured to determine whether the rider's foot is positioned/stepped on the first top surface 101 and, upon determining that the rider's foot is positioned/stepped on the first top surface 101, send a signal to the first microcontroller 501 to activate the first motor 515.

The first step detection device 509 may include any suitable mechanism, structure, or device for determining whether the rider is on the electric vehicle 10 or the first foot platform 100. For example, the first step detection device 509 may include one or more mechanical buttons, one or more capacitive sensors, one or more inductive sensors, one or more optical/photoelectric switches, one or more force-resistive sensors, and/or one or more strain gauges. The one or more mechanical buttons may be located above or below the first top surface 101. These mechanical buttons may be pressed directly (e.g., if located on the surface) or indirectly (e.g., if located below the surface) to sense whether the rider is on the first foot platform 100. The one or more capacitive sensors and/or inductive sensors may be located on or near the surface of either or both parts of the first top surface 101 and may detect the presence of the rider on the first top surface 101 through changes in capacitance or inductance, respectively. Similarly, the one or more optical switches may be located on or near the first top surface 101. These optical switches may detect whether the rider is on the first top surface 101 based on optical signals. The one or more strain gauges may be configured to measure the bending of the platform or shaft caused by the rider's foot to detect whether the rider is on the first top surface 101.

In some embodiments, the power switch 519 may include a handheld "dead-man" switch.

If the first step detection device 509 detects that the rider is appropriately positioned/stepped on the first foot platform 100, the first step detection device 509 may then send a rider presence signal to the first microcontroller 501. The rider presence signal may be a signal that activates the first motor 515. In response to the rider presence signal (and/or the first top surface 101 moving to a horizontal orientation), the first microcontroller 501 may activate the aforementioned feedback control loop to drive the first motor 515. For example, in response to the rider presence signal, the first microcontroller 501 may process the orientation/attitude information (or measurement data) of the first foot platform 100 sensed by the first sensor 504, and output a control signal matching the attitude information to the first motor driver 502. The first motor driver 502 then provides corresponding power or current to the first motor 515 based on the control signal, causing the first motor 515 to output the corresponding torque.

In some embodiments, if the first step detection device 509 detects that the rider is no longer appropriately positioned on or present on the first foot platform 100, the first step detection device 509 may send a rider absence signal to the first microcontroller 501. In response to the rider absence signal, the control circuit of the electric vehicle 10 or the first foot platform 100 (e.g., the first microcontroller 501 and the first motor driver 502) may be configured to reduce the rotational speed of the rotor of the first motor 515 relative to the stator, thereby stopping the electric vehicle 10 or the first foot platform 100. For example, power may be selectively supplied to the rotor's coils to reduce the rotor's rotational speed. In some embodiments, in response to the rider absence signal, the control circuit of the electric vehicle 10 or the first foot platform 100 may be configured to energize the coils with a relatively strong and/or substantially continuous constant voltage to lock the rotor relative to the stator, preventing the rotor from rotating relative to the stator and/or causing the rotor to stop abruptly.

In some embodiments, the electric vehicle 10 or the first foot platform 100 may be configured to actively drive the first motor 515 even if the rider may not be present on the electric vehicle 10 or the first foot platform 100 (e.g., temporarily), which may allow the rider to perform various stunts. For example, the first step detection device 509 may be configured to delay sending the rider absence signal to the first microcontroller 501 for a predetermined duration, and/or the first microcontroller 501 may be configured to delay sending a signal to the first motor driver 502 to cut off power to the first motor 515 for a predetermined duration.

Figure 6:
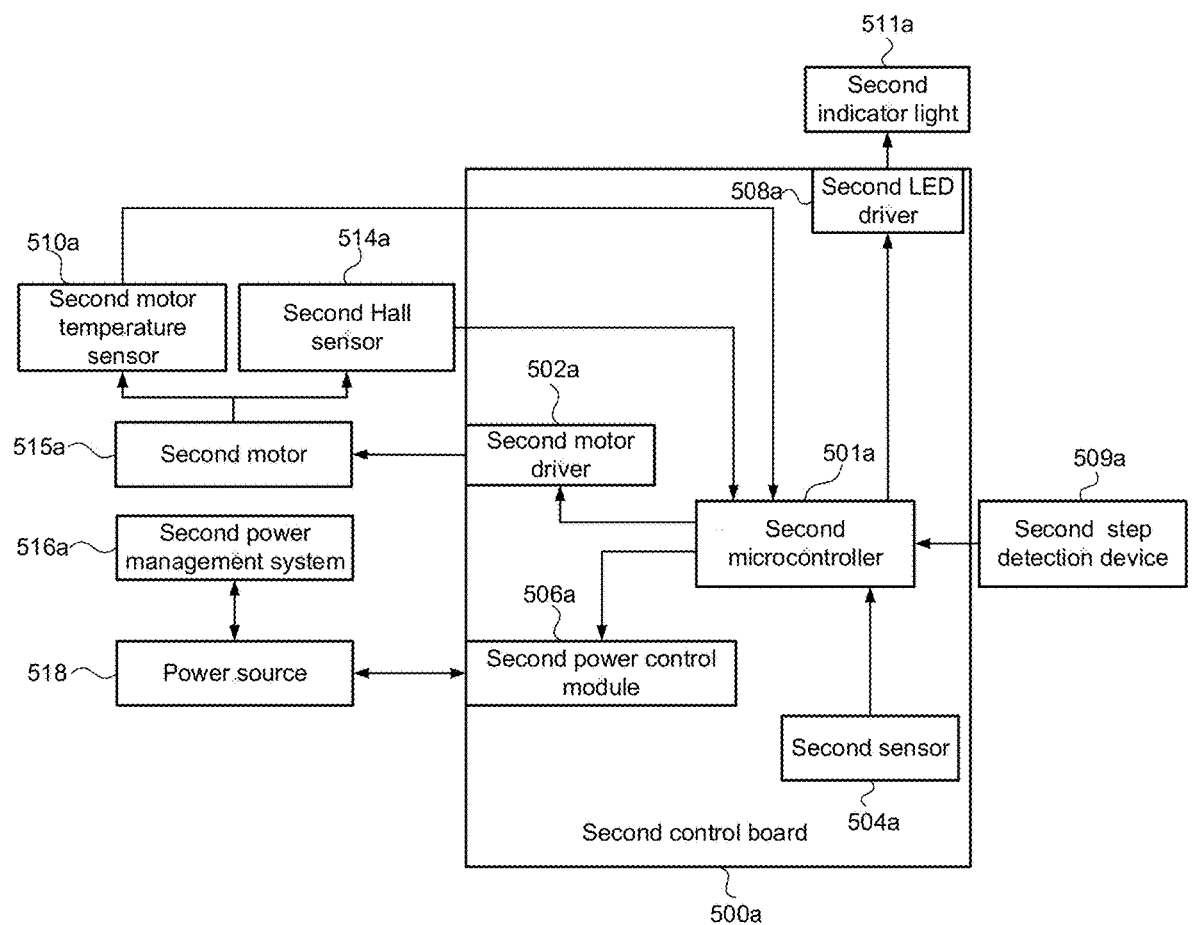
FIG. 6 is a schematic diagram illustrating the composition of another portion of the electrical components of the electric vehicle according to an embodiment of the present application.

In some embodiments, referring to FIG. 6, various electrical components of the electric vehicle 10, including the second control board 500a, are illustrated. These electrical components are primarily distributed within the second foot platform 200 to support the implementation of related functions of the second foot platform 200, such as attitude data detection of the foot platform and motor driving for dynamic balancing/self-balancing purposes.

The one or more electrical components within the second foot platform 200 may include the second control board 500a, the power source 518, a second step detection device 509a, a second Hall sensor 514a, a second motor 515a, a second power management system 516a, and a second indicator light 511a, among others. It should be noted that one or more electrical components within the first foot platform 100 and the second foot platform 200 may be interconnected to at least enable communication and/or power transmission. For example, the first control board 500 and the second control board 500a may be interconnected and communicate with each other, so a single power switch 519 is sufficient to control the power on/off for both foot platforms. Additionally, the first microcontroller 501 and the second microcontroller 501a may collaboratively control the electric vehicle 10 through relevant communication protocols.

It should be noted that, in some embodiments, the electrical components within the second foot platform 200 may be similar in hardware and software composition to the corresponding electrical components within the first foot platform 100. Therefore, the functional principles of these similar electrical components in the two foot platforms may be understood or interpreted in a similar manner, as the differences primarily lie in their placement and the objects they act upon. For instance, the first microcontroller 501 is primarily used to control the functions related to the balancing vehicle of the first foot platform 100, while the second microcontroller 501a is primarily used to control the functions related to the balancing vehicle of the second foot platform 200. In some embodiments, the similarity in the functional principles of the related components may also indicate that their hardware and software compositions/structures are similar.

In some embodiments, this similarity may be reflected in the reference numerals of the related electrical components in the drawings. For example, the first microcontroller 501 and the second microcontroller 501a have similar functional principles, and specifically, the second microcontroller 501a also includes a PID controller. Similarly, the first sensor 504 and the second sensor 504a have similar functional principles; specifically, the second sensor 504a may be used to detect changes in the attitude, orientation, tilt state, or position of the second foot platform 200 (e.g., rotation of the second foot platform 200 about the pitch axis D2) and generate corresponding attitude sensing signals to be sent to the second microcontroller 501a. Likewise, the first motor driver 502 and the second motor driver 502a have similar functional principles; specifically, the second motor driver 502a may also output corresponding current or power to the second motor 515a based on a control signal (e.g., a PWM signal for controlling motor rotation) calculated by the second microcontroller 501a that matches the corresponding attitude sensing signal, thereby causing the second motor 515a to rotate and/or provide a force to counteract changes in the attitude of the second foot platform 200 and maintain the balance or stability of the second foot platform 200.

Similarly, the functional principles of the first LED driver 508 and the second LED driver 508a are similar. Specifically, one or more components of the front/rear light assembly (e.g., their corresponding illuminators) may be connected to the second microcontroller 501a via the second LED driver 508a. The second LED driver 508a may be either integrated within or connected to the second main control board 500a.

Similarly, the functional principles of the first motor temperature sensor 510 and the second motor temperature sensor 510a are similar. Specifically, the second motor temperature sensor 510a may be configured to measure the temperature of the second motor 515a and transmit the measured temperature to the second microcontroller 501a. The second microcontroller 501a may limit the power supplied to the second motor 515a based on the measured temperature to prevent overheating of the second motor 515a.

Similarly, the second power control module 506a has a hardware and software composition and functional principle similar to those of the first power control module 506. Furthermore, the second step detection device 509a has a hardware and software composition and functional principle similar to those of the first step detection device 509. Other similar electrical components in the two foot platforms are not described in detail herein.

Similarly, the active balancing (also referred to as self-stabilization or self-balancing) state/mode of the second foot platform 200 may be achieved through the use of a second feedback control loop or mechanism. The second feedback control loop or mechanism likewise involves multiple components within the second foot platform 200, including, for example, hardware modules such as the second sensor 504a and the second microcontroller 501a (MCU), as well as firmware modules or other related software modules for executing feedback control algorithms or self-balancing algorithms. The feedback control loop or mechanism may be implemented in one or more electrical components. Furthermore, the second feedback control loop may also include a PID controller. Thus, through this feedback control approach, the second feedback control loop may continuously adjust the rotational speed of the second motor 515a within the second wheel 400 to more closely match the desired rotational speed calculated by the second feedback control loop, which corresponds to the attitude/tilt angle of the second foot platform 200, thereby ensuring that the second foot platform 200 remains stable/balanced under various conditions.

It should be noted that the foregoing description focuses on the respective compositions or self-balancing functions of the first foot platform 100 and the second foot platform 200. Building on the foregoing description, the overall self-balancing or dynamic balancing functionality of the electric vehicle 10 will now be further described. When the rider's feet step onto the first foot platform 100 and the second foot platform 200, both of which are in a horizontal orientation, the rider's first foot causes the first foot platform 100 to tilt at an angle, for example, θ1, where θ1 represents the rotational angle of the first foot platform 100 about the pitch axis D2. This angle θθ is detected by the first sensor 504 and transmitted to the first microcontroller 501 in the form of a sensed signal. The first microcontroller 501 then drives the first wheel 300 to rotate based on θ1 and causes the first motor 515 to generate a force to maintain the first foot platform 100 in a balanced/stable state. Similarly, the rider's second foot causes the second foot platform 200 to tilt at an angle, for example, θ2, where θ2 also represents the rotational angle of the second foot platform 200 about the pitch axis D2. This angle θ2 is detected by the second sensor 504a and transmitted to the second microcontroller 501a in the form of a sensed signal. The second microcontroller 501a then drives the second wheel 400 to rotate based on θ2 and causes the second motor 515a to generate a force to maintain the second foot platform 200 in a balanced/stable state. It may be seen that the motion of the electric vehicle 10 (e.g., moving straight or turning) may be simply controlled by the rider's feet, while during the motion, the electric vehicle 10 may maintain a self-balancing state. Since the electric vehicle 10 remains self-balanced during its motion, the rider it carries may also remain balanced (at least without tipping over from the electric vehicle 10). The following sections will continue to describe in detail how the electric vehicle 10 moves (e.g., moves straight or turns) under the control of the rider's feet.

It should be noted that the first microcontroller 501 and the second microcontroller 501a may share the angle data θ1 and θ2 via a communication cable. Furthermore, the first microcontroller 501 and the second microcontroller 501a may independently and/or collaboratively control the two wheels of the electric vehicle 10 to rotate based on θ1 and/or θ2 through relevant communication protocols. It is also worth noting that when the rider first boards the vehicle, the state in which both the first foot platform 100 and the second foot platform 200 are in a horizontal orientation (e.g., specifically referring to the first top surface 101 and the second top surface 201 being parallel to the horizontal ground) may be achieved through a power-on self-balancing control algorithm.

In some embodiments, when θ1 and θ2 are the same (both in direction and magnitude), the first microcontroller 501 and the second microcontroller 501a may respectively control the first wheel 300 and the second wheel 400 to rotate in the same direction and at the same speed. In this case, the rider may operate the electric vehicle 10 to move straight forward (advance) or backward (retreat), while during the motion, the motors of the left and right wheels will also provide torque or force to counteract the tilt imposed on the two foot platforms due to the shift in the rider's center of gravity. This torque or force provided by the two motors will cause the two foot platforms to tend to return to a horizontal orientation, thereby ensuring the dynamic stability/dynamic balance of the electric vehicle 10. When the magnitudes of θ1 and θ2 increase or decrease simultaneously by the same amount, the electric vehicle 10 may accelerate forward or backward. Here, the forward direction may refer to the direction of the arrow of the roll axis D3, while the backward direction may refer to the opposite direction of the arrow of the roll axis D3. Additionally, θ1 and θ2 may be considered the same angle data within a certain difference range; for example, when the difference between θ1 and θ2 is within 0.005°, θ1 and θ2 may be deemed by the controller of the electric vehicle 10 as sufficiently identical angle data.

Next, the scenario where θ1 and θ2 are different will be described. First, a convention for the positive and negative directions of the angles is established. Taking θ1 as an embodiment, when the rider's first foot presses forward on the top surface of the first foot platform 100, the first foot platform 100 tilts forward. Viewed from another perspective, the first foot platform 100 rotates clockwise about the pitch axis D2 (e.g., in the direction d shown in FIG. 1). In this case, the resulting θ1 is in the positive direction, and the value of θ1 is also denoted as a positive value. If the first foot platform 100 rotates counterclockwise about the pitch axis D2, θ1 is in the negative direction, and the value of θ1 is denoted as a negative value. The positive and negative directions of θ2 are defined similarly; for example, when the second foot platform 200 rotates clockwise about the pitch axis D2, θ2 is in the positive direction, and otherwise, it is in the negative direction. Thus, several scenarios may arise, such as both θ1 and θ2 being in the positive direction, both θ1 and θ2 being in the negative direction, or one of θ1 and θ2 being positive while the other is negative. When both θ1 and θ2 are in the positive direction, it may be understood that the electric vehicle 10 as a whole tilts forward, or the rider's center of gravity shifts forward. When both θ1 and θ2 are in the negative direction, it may be understood that the electric vehicle 10 as a whole tilts backward, or the rider's center of gravity shifts backward. Additionally, when comparing the magnitudes of θ1 and θ2, it may be stipulated that a positive angle value is directly greater than a negative angle value; for example, a θ1 of +0.5° is greater than a θ2 of −0.5°.

When both θ1 and θ2 are in the positive direction, if θ1 is greater than θ2, the rotational speed of the first wheel 300, controlled by the first microcontroller 501 to move forward (rotating clockwise about the pitch axis D2), will be greater than the rotational speed of the second wheel 400, controlled by the second microcontroller 501a to move forward (rotating clockwise about the pitch axis D2). As a result, the electric vehicle 10 as a whole will turn to the left. Here, as previously described, the forward direction of the electric vehicle 10 refers to the direction of the arrow of the roll axis D3; thus, the left side/left direction of the electric vehicle 10 may be considered the direction from the first wheel 300 toward the second wheel 400. Furthermore, if θ1 is less than θ2, it may be similarly understood that the electric vehicle 10 as a whole will turn to the right. The motion scenario when both θ1 and θ2 are in the negative direction may be understood similarly. Additionally, when the rider stands on the electric vehicle 10, their face is oriented toward the direction of the arrow of the roll axis D3; therefore, the forward motion of the electric vehicle 10 is in the direction of the rider's face orientation.

Next, consider the scenario where the directions of θ1 and θ2 are different, for example, where θ1 is a positive angle resulting from the rider's first foot tilting/pressing the first foot platform 100 forward, such as +0.5°, and θ2 is a negative angle resulting from the rider's second foot tilting/pressing the second foot platform 200 backward, such as −0.5°. In this case, the first wheel 300, under the control of the first microcontroller 501, will rotate forward (also referred to as positive rotation), while simultaneously, the second wheel 400, under the control of the second microcontroller 501a, will rotate backward (also referred to as reverse rotation). Consequently, the overall motion state of the electric vehicle 10 will be essentially an in-place rotation/turn. Specifically, in this case, the in-place turning direction of the electric vehicle 10 as a whole will be a counterclockwise rotation about the yaw axis D1, shown in FIG. 1 as rotating in the circumferential direction indicated by d1. Conversely, if θ1 is −0.5° and θ2 is +0.5°, the in-place turning direction of the electric vehicle 10 as a whole will be a clockwise rotation about the yaw axis D1, shown in FIG. 1 as rotating in the direction opposite to the circumferential direction indicated by d1. Additionally, the in-place turning/rotation of the electric vehicle 10 as a whole may be considered a special case of its turning motion.

In other embodiments, the electric vehicle 10 may include only a single control board or control device, and this control board may have only a single microcontroller (MCU). The installation position of this single MCU is not particularly limited, and the single MCU may be of the same or similar type as the aforementioned first microcontroller 501. The single MCU may be disposed in either the first foot platform 100 or the second foot platform 200. In this embodiment, the other electrical components within the electric vehicle 10 may be substantially the same as those in the electric vehicle 10 of the previous embodiments. For instance, the electric vehicle 10 in this embodiment may still include two inertial sensors, such as six-axis gyroscopes, respectively disposed in the left and right foot platforms, to measure the tilt angle data of the two foot platforms and transmit the measured tilt angle data to the single MCU. For example, the tilt angle data for the first foot platform 100 may be θ3, and the tilt angle data for the second foot platform 200 may be θ4. The principle and process by which the single MCU controls the motion of the electric vehicle 10 and maintains its dynamic balance during motion based on θ3 and θ4 are similar to the control principles and processes of the first microcontroller 501 or the second microcontroller 501a in the previous embodiments, such as both utilizing PID control.

Figure 7:
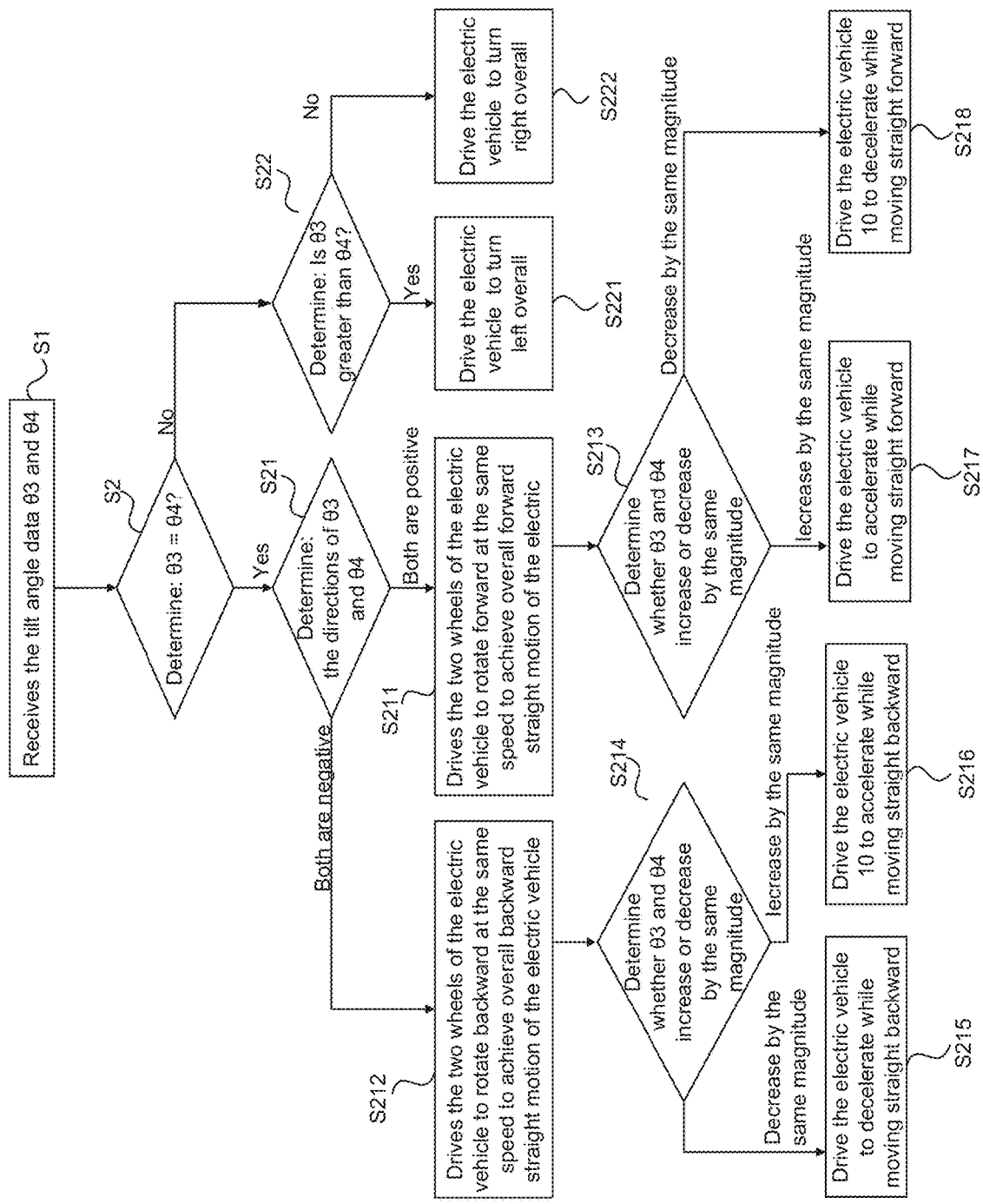
FIG. 7 is a control flowchart of a controller involved in the electric vehicle according to an embodiment of the present application.

Referring to FIG. 7, a flowchart is shown illustrating the process by which the aforementioned single controller controls the motion of the electric vehicle 10 based on the detected θ3 and θ4. The specific description of the process is as follows:

In step S1, the single controller receives the tilt angle data θ3 and θ4 for the two foot platforms.

In step S2, the single controller determines whether θ3 and θ4 are the same. If they are the same, the process proceeds to step S21. In step S21, the single controller further determines whether the directions of θ3 and θ4 are the same. If the directions are both positive, for example, both resulting from the foot platforms rotating clockwise about the pitch axis D2, the process proceeds to step S211. In step S211, the single controller drives the two wheels of the electric vehicle 10 to rotate forward at the same speed to achieve overall forward straight motion of the electric vehicle 10. After executing step S211, the single controller proceeds to step S213 to determine whether θ3 and θ4 increase or decrease by the same magnitude. If they decrease by the same magnitude, the process proceeds to step S218 to drive the electric vehicle 10 to decelerate while moving straight forward. If they increase by the same magnitude, the single controller executes step S217 to drive the electric vehicle 10 to accelerate while moving straight forward.

Additionally, in executing step S21, if it is determined that the directions of θ3 and θ4 are both negative, the process proceeds to step S212. At this point, the single controller drives the two wheels of the electric vehicle 10 to rotate backward at the same speed to achieve overall backward straight motion of the electric vehicle 10. After executing step S212, the single controller proceeds to step S214 to determine whether θ3 and θ4 increase or decrease by the same magnitude. If they decrease by the same magnitude, the process proceeds to step S215 to drive the electric vehicle 10 to decelerate while moving straight backward. If they increase by the same magnitude, the single controller executes step S216 to drive the electric vehicle 10 to accelerate while moving straight backward.

Furthermore, in executing step S2, if it is determined that θ3 and θ4 are different (e.g., differing in magnitude or direction), the control process proceeds to step S22 to further determine whether θ3 is greater than θ4. If θ3 is greater than θ4, the single controller executes step S221 to drive the electric vehicle 10 to turn left overall, which includes the case of the electric vehicle 10 turning left in place. If θ3 is less than θ4, the single controller executes step S222 to drive the electric vehicle 10 to turn right overall.

It should be noted that the number of controllers configured in the electric vehicle 10 of the present application is generally up to two, which is sufficient to meet the various control function requirements of the electric vehicle 10.

In some embodiments, referring to FIG. 3, the first wheel 300 may include a stator shaft 301 that extends substantially outward from the middle position of the first wheel 300 (where "outward" refers to the direction from the first wheel 300 toward the second wheel 400). Similarly, the second wheel 400 may include a stator shaft 401 that extends substantially outward from the middle position of the second wheel 400 (where "outward" refers to the direction from the second wheel 400 toward the first wheel 300). It may be seen that the extension directions of the stator shaft 301 and the stator shaft 401 are directly opposite to each other. The stator shaft 301 may be fixedly connected/assembled to the first tubular support shaft 110, for example, by being secured together with screws. Similarly, the stator shaft 401 may be fixedly connected/assembled to the second tubular support shaft 210. The stator shafts may be fixed to the left and right tubular support shafts by means such as screws or welding, and the present application imposes no limitation in this regard.

Additionally, in this embodiment, the stator shaft 301 is referred to as a stator shaft because it may itself be an extension of the stator of the first motor 515 of the first wheel 300, while the tire 302 of the first wheel 300, which contacts the ground, may be fixed/assembled to the rotor of the first motor 515 inside the first wheel 300. Therefore, when the rotor of the first motor 515 rotates relative to the stator, the tire 302 also rotates relative to the stator shaft 301. In this assembly configuration, as described previously, the stator shaft 301 is fixed to the first tubular support shaft 110, and the first tubular support shaft 110 is fixedly installed within the first foot platform 100, where the first control board 500 is fixedly installed, and the first sensor 504 is fixed to the first control board 500. Thus, it may be seen that the stator shaft 301, the first foot platform 100, and the first sensor 504 may move synchronously, for example, rotating or remaining stationary together. In this case, it may also be considered that the first sensor 504 is fixedly installed on the stator shaft 301. Therefore, when the rider's foot steps on the first foot platform 100 and causes the first foot platform 100 to tilt, the stator shaft 301 will also synchronously tilt in the same manner. In this scenario, it is equivalent to the rider's foot directly stepping on the stator shaft 301. Consequently, when the first sensor 504 detects and outputs a tilt angle signal, it is effectively detecting the tilt angle of the stator shaft 301 directly, which may avoid interference from other components of the electric vehicle 10 on the output tilt angle signal, thereby significantly improving the accuracy of the detected signal. Furthermore, the self-balancing control of the electric vehicle 10 may be more responsive; for example, the electric vehicle 10 may more easily respond to minute changes in the rider's posture (e.g., a tilt angle change of 0.05 degrees) and initiate motion, achieving a self-balancing sensation akin to mind-controlled operation. Similarly, the technical effect brought about by the stator shaft 401 being fixedly connected to the second tubular support shaft 210 is analogous, and further elaboration is omitted here.

In some embodiments, communication or power cables 20 are disposed between the left and right foot platforms of the electric vehicle 10, meaning that these cables 20 extend simultaneously within both the first foot platform 100 and the second foot platform 200. These cables 20 enable the sharing of certain data, such as foot platform attitude data or motor operating condition data, between the control board in the first foot platform 100 and the control board in the second foot platform 200. Additionally, since the battery assembly may often be disposed in only one of the foot platforms for structural optimization purposes, cables are also required to be disposed between the left and right foot platforms to transmit electrical power.

Additionally, as described previously, the left and right foot platforms 100, 200 of the electric vehicle 10 are capable of relative rotation, and the two tubular support shafts 110, 210 are also capable of relative rotation. Consequently, it is necessary to impose restrictions on the relative rotational movement of the two foot platforms and/or the two tubular support shafts to ensure that the cables are not damaged due to excessive twisting during rotation. Therefore, certain structures/components are required to limit the angle of relative rotation (e.g., circumferential rotation about D2) of the left and right foot platforms 100, 200 of the electric vehicle 10 to prevent it from becoming excessive. Furthermore, the left-right direction of the electric vehicle 10, as defined by the pitch axis D2, may also be referred to as the axial direction of the electric vehicle 10. This axial direction may also be considered the axial direction of the two foot platforms and the two tubular support shafts. It may be observed that in the axial direction, it is necessary to restrict relative movement between the left and right foot platforms and/or the two tubular support shafts, as such movement in the axial direction manifests as loosening of the connection or assembly relationship between components/elements, for example, allowing the two tubular support shafts to move/slide relative to each other. On one hand, this may cause damage to the cables 20 installed within the foot platforms, such as the cables 20 being excessively stretched or compressed. On the other hand, it may also lead to accidents during riding, for example, relative movement/sliding of the left and right foot platforms interfering with the rider's normal operation. Therefore, the electric vehicle 10 also requires certain structures/components to restrict or prevent axial movement of the two foot platforms and the two tubular support shafts relative to each other, which also enhances the overall structural stability of the electric vehicle 10. In the exemplary description below, solutions related to such technical issues will be specifically introduced.

As shown in FIGS. 5 and 6, the electric vehicle 10 may simultaneously include an axial constraint mechanism 700 and a rotational constraint mechanism 800. Specifically, as shown in FIG. 6, the axial constraint mechanism 700 includes a first axial constraint member 710 disposed on the first tubular support shaft 110 and a second axial constraint member 720 disposed on the second tubular support shaft 210. The first axial constraint member 710 and the second axial constraint member 720 are configured to cooperate with each other to restrict axial movement of the first tubular support shaft 110 and the second tubular support shaft 210 relative to each other. Since the first tubular support shaft 110 and the second tubular support shaft 210 are fixed to the first foot platform 100 and the second foot platform 200, respectively, the cooperation between the first axial constraint member 710 and the second axial constraint member 720 also restricts axial movement of the first foot platform 100 and the second foot platform 200 relative to each other.

As shown in FIG. 5, the rotational constraint mechanism 800 may include a first rotational constraint member 810 disposed on the first foot platform 100 and a second rotational constraint member 820 disposed on the second foot platform 200. The first rotational constraint member 810 and the second rotational constraint member 820 are configured to cooperate with each other to limit the rotation of the first foot platform 100 and the second foot platform 200 relative to each other. That is, the first foot platform 100 and the second foot platform 200 may only rotate relative to each other within a certain angular range and may not rotate without limitation. It should be noted that the rotation of the first foot platform 100 or the second foot platform 200 may refer to circumferential rotation about the pitch axis D2. Since the first tubular support shaft 110 and the second tubular support shaft 210 are fixed to the first foot platform 100 and the second foot platform 200, respectively, the cooperation between the first rotational constraint member 810 and the second rotational constraint member 820 also limits the angle of rotation of the first tubular support shaft 110 and the second tubular support shaft 210 relative to each other.

Thus, the electric vehicle 10 may, on one hand, restrict the first tubular support shaft 110 and the second tubular support shaft 210 from moving/sliding relative to each other in the axial direction through the axial constraint mechanism 700, and on the other hand, limit the angle of rotation of the first foot platform 100 and the second foot platform 200 relative to each other through the rotational constraint mechanism 800. For ease of understanding, the support assembly formed by the first tubular support shaft 110 and the second tubular support shaft 210 in FIG. 5 may be entirely replaced by the support assembly formed by the first tubular support shaft 110 and the second tubular support shaft 210 in FIG. 6, which facilitates understanding of the two types of restrictions (axial restriction and circumferential rotation restriction) that coexist in the electric vehicle 10.

Optionally, as shown in FIGS. 2 and 4, the first tubular support shaft 110 is centrally fixed in the middle of the first foot platform 100, and the second tubular support shaft 210 is centrally fixed in the middle of the second foot platform 200. That is, in the width direction (defined by the axis D3) and the thickness direction (defined by the axis D1) of the first foot platform 100, the first tubular support shaft 110 is centrally disposed within the first foot platform 100, and in the width direction and the thickness direction of the second foot platform 200, the second tubular support shaft 210 is centrally disposed within the second foot platform 200. By arranging them in this manner, the rider's first foot and second foot may step on the first foot platform 100 and the second foot platform 200 more stably, making it easier for the rider to maintain balance and avoid falling.

Further, as shown in FIG. 3, the first foot platform 100 includes a first upper shell 130 and a first lower shell 140, with the first upper shell 130 and the first lower shell 140 being arranged vertically and connected to each other, and the first tubular support shaft 110 being disposed between the first upper shell 130 and the first lower shell 140. The second foot platform 200 includes a second upper shell 230 and a second lower shell 240, with the second upper shell 230 and the second lower shell 240 being arranged vertically and connected to each other, and the second tubular support shaft 210 being disposed between the second upper shell 230 and the second lower shell 240. In this way, both the first foot platform 100 and the second foot platform 200 are composed of two parts assembled together, facilitating the assembly of various components of the electric vehicle. Additionally, in terms of manufacturing materials, the first tubular support shaft 110 and the second tubular support shaft 210 are typically made of metallic materials such as steel or iron, while the upper and lower shells of the two foot platforms (100 and 200) are generally made of non-metallic materials such as plastic. Therefore, in the entire electric vehicle 10, the support assembly formed by the two tubular support shafts may be considered the most fundamental load-bearing component. Furthermore, the upper and lower shells of the two foot platforms (100 and 200) may be fixed to the left and right support shafts using fasteners such as screws.

Moreover, the first upper shell 130 is detachably provided with a first pedal 131, and the second upper shell 230 is detachably provided with a second pedal 231. The first pedal 131 and the second pedal 231 are configured for the user's first foot and second foot to step on, respectively. A first spring 150 is connected to the lower surface of the first pedal 131, with the end of the first spring 150 away from the first pedal 131 abutting against the first pedal 131. A second spring 250 is connected to the lower surface of the second pedal 231, with the end of the second spring 250 away from the second pedal 231 abutting against the second pedal 231. By providing the first spring 150 and the second spring 250, the user's stepping action may be cushioned to distribute stress, preventing damage to the first pedal 131 and the second pedal 231. Additionally, the provision of the first spring 150 and the second spring 250 may also enable the functionality of a specific step detection device. For example, the specific step detection device may be a photoelectric switch that sends a corresponding signal to the controller when the rider presses down on the spring, allowing the controller to detect that the rider has stepped onto the electric vehicle 10.

Optionally, the first tubular support shaft 110 is connected to the first upper shell 130 via a first fixing bolt 160, and the second tubular support shaft 210 is connected to the second upper shell 230 via a second fixing bolt 260. This ensures that the fixation of the first tubular support shaft 110 within the first foot platform 100 and the fixation of the second tubular support shaft 210 within the second foot platform 200 are both more secure.

Optionally, as shown in FIG. 3, both the first tubular support shaft 110 and the second tubular support shaft 210 are circular tubular structures. The end of the first tubular support shaft 110 away from the first wheel 300 is inserted into the end of the second tubular support shaft 210 away from the second wheel 400 to achieve a rotational connection between the first tubular support shaft 110 and the second tubular support shaft 210. Moreover, the portion of the first tubular support shaft 110 inserted into the second tubular support shaft 210 is dimensionally adapted to the second tubular support shaft 210 to ensure the stability of the connection between the first tubular support shaft 110 and the second tubular support shaft 210.

Further, as shown in FIG. 3, a bushing 900 is sleeved on the end of the first tubular support shaft 110 that is inserted into the second tubular support shaft 210. That is, the bushing 900 is disposed between the first tubular support shaft 110 and the second tubular support shaft 210. The bushing 900 is configured to reduce friction during rotation between the first tubular support shaft 110 and the second tubular support shaft 210, thereby enabling smoother rotation.

Figure 11:
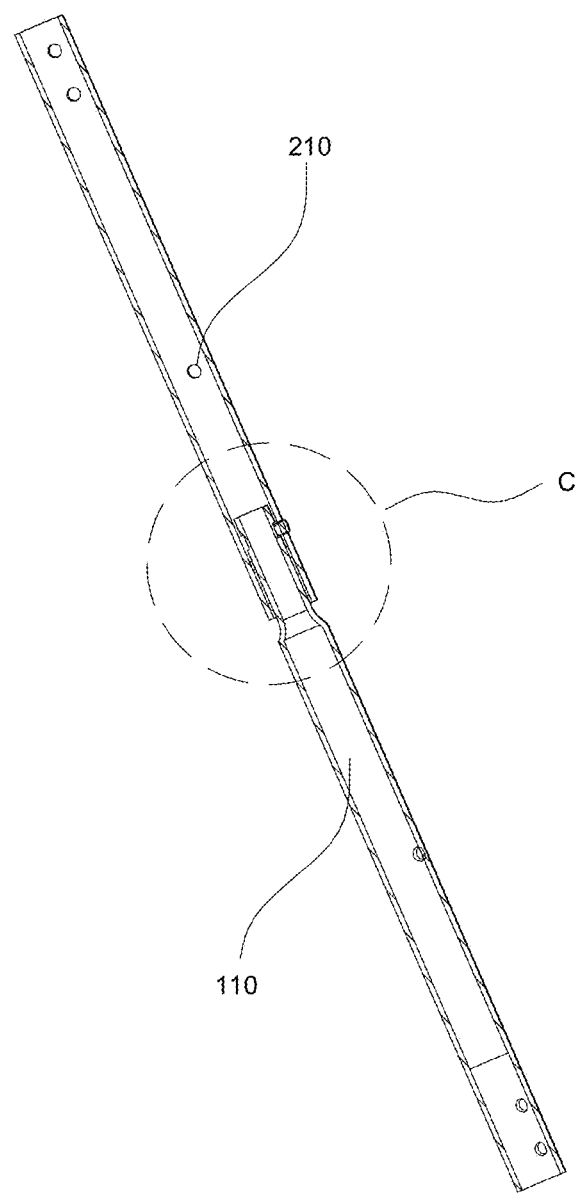
FIG. 11 is a schematic structural diagram of a first embodiment of the axial constraint mechanism according to an embodiment of the present application.
Figure 12:
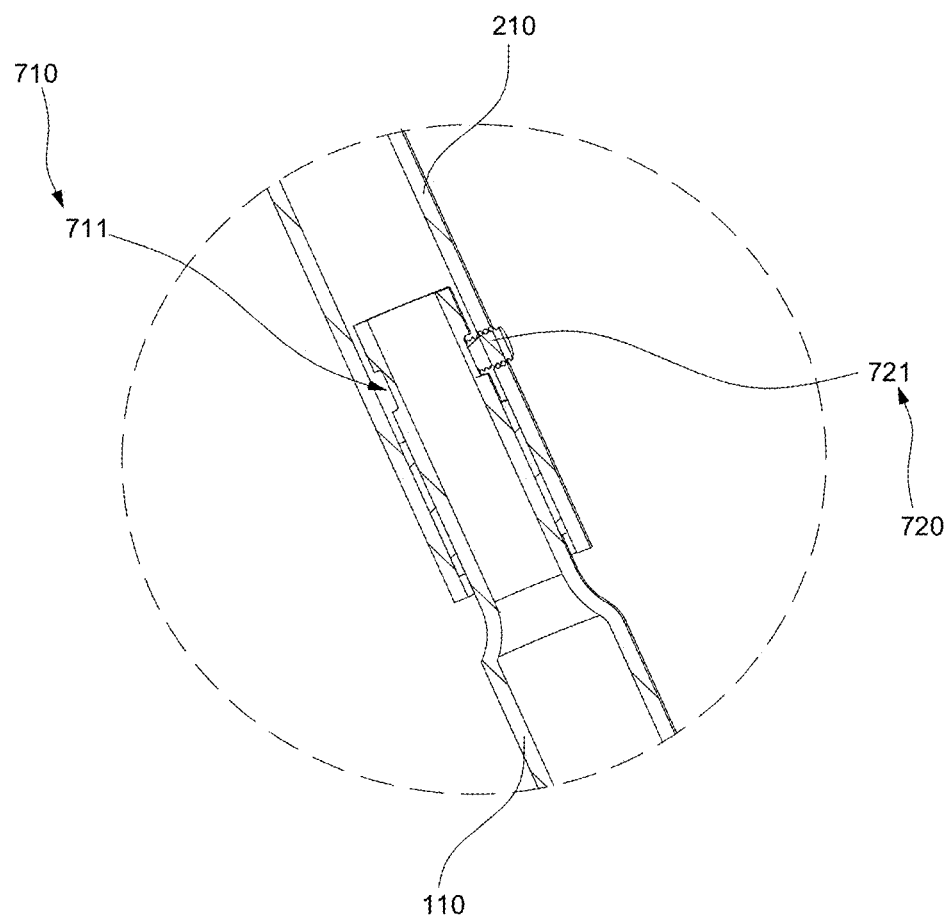
FIG. 12 is another schematic structural diagram of the first embodiment of the axial constraint mechanism according to an embodiment of the present application.

As shown in FIGS. 11 and 12, a first embodiment of the axial constraint mechanism is illustrated. Specifically, in the first embodiment of the first axial constraint member 710, it is configured as a first annular groove 711 formed on the outer surface of the first tubular support shaft 110. Correspondingly, in the first embodiment of the second axial constraint member 720, it is configured as a first bolt 721 disposed on the second tubular support shaft 210. The first bolt 721 cooperates with the first annular groove 711 to restrict axial movement of the first tubular support shaft 110 and the second tubular support shaft 210 relative to each other along the axial direction A (which is the direction along the axis D2). The first annular groove 711 refers to a continuous groove formed around the circumference of the outer wall of the first tubular support shaft 110 at an end portion thereof.

Additionally, the first bolt 721 is fixedly disposed on the second tubular support shaft 210, and the first bolt 721 is located on the portion of the second tubular support shaft 210 that is sleeved over the first tubular support shaft 110. The end of the first bolt 721 located inside the second tubular support shaft 210 is embedded within the first annular groove 711, and the two sides of the first bolt 721 respectively abut against the two sidewalls of the first annular groove 711. Thus, through the cooperation of the first bolt 721 and the first annular groove 711, axial movement of the first tubular support shaft 110 relative to the second tubular support shaft 210 along the axial direction A is restricted, preventing the first tubular support shaft 110 and the second tubular support shaft 210 from moving relative to each other in the axial direction A. However, the first bolt 721 may slide along the first annular groove 711, meaning that the cooperation between the first bolt 721 and the first annular groove 711 does not restrict the rotation of the first tubular support shaft 110 and the second tubular support shaft 210 relative to each other.

Figure 9:
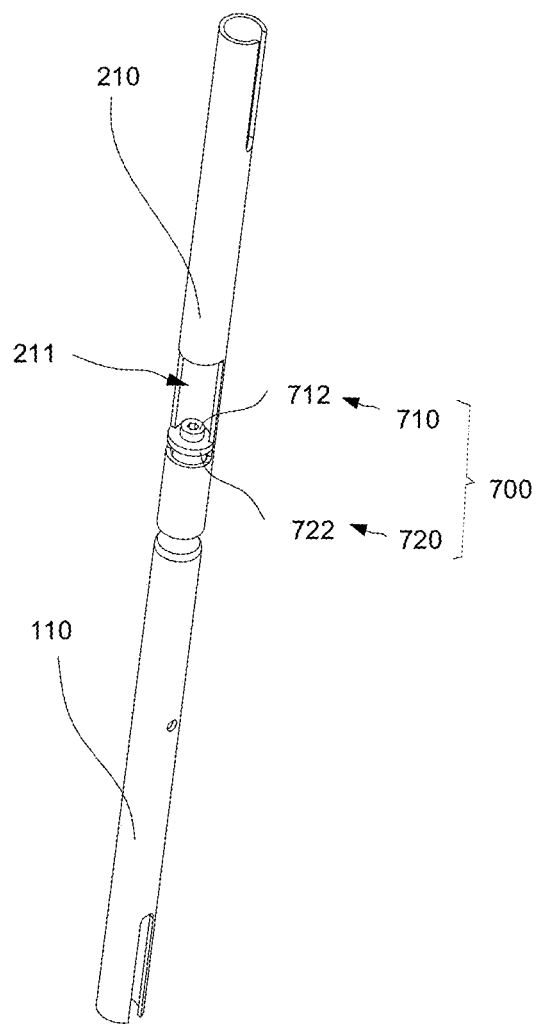
FIG. 9 is a schematic structural diagram of a second embodiment of an axial constraint mechanism according to an embodiment of the present application.
Figure 10:
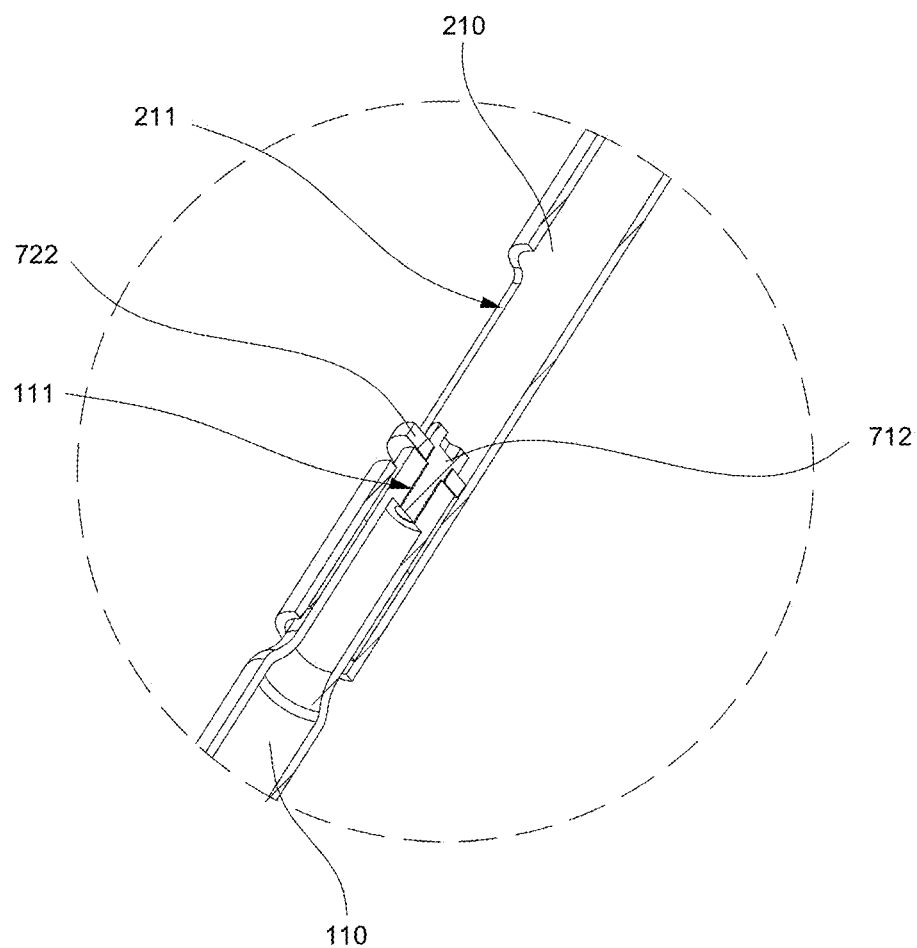
FIG. 10 is another schematic structural diagram of the second embodiment of the axial constraint mechanism according to an embodiment of the present application.

In some embodiments, referring to FIGS. 9 and 10, a second embodiment of the axial constraint mechanism is illustrated. Specifically, in this embodiment, the first axial constraint member 710 is configured as a second bolt 712 connected to the first tubular support shaft 110. Correspondingly, the second embodiment of the second axial constraint member 720 is configured as a connecting plate 722 fixed within the second tubular support shaft 210. The connecting plate 722 cooperates with the second bolt 712 to restrict axial movement/sliding of the first tubular support shaft 110 and the second tubular support shaft 210 relative to each other.

The end of the first tubular support shaft 110 away from the first wheel 300 abuts against the connecting plate 722 located within the second tubular support shaft 210, and the end of the first tubular support shaft 110 abutting the connecting plate 722 has a threaded hole 111. The connecting plate 722 has a through-hole 7221, which corresponds to the threaded hole 111, meaning that the central axis of the through-hole 7221 coincides with the central axis of the threaded hole 111. The second bolt 712 passes through the through-hole 7221 and is threadedly connected to the first tubular support shaft 110 via the threaded hole 111. The two sides of the connecting plate 722 respectively abut against the head of the second bolt 712 and the end of the first tubular support shaft 110, meaning that the connecting plate 722 is clamped between the head of the second bolt 712 and the end of the first tubular support shaft 110 facing the connecting plate 722. Since the connecting plate 722 is fixedly connected to the second tubular support shaft 210, the cooperation between the connecting plate 722 and the second bolt 712 prevents the second tubular support shaft 210 from moving relative to the first tubular support shaft 110 in the axial direction A.

Further, as shown in FIGS. 9 and 10, the second tubular support shaft 210 has a notch 211 corresponding to the connecting plate 722. The notch 211 is configured to facilitate the assembly of the second bolt 712 within the second tubular support shaft 210 by allowing the second bolt 712 to be inserted into the second tubular support shaft 210 for subsequent assembly operations. Undoubtedly, the size of the notch 211 is sufficient to allow the second bolt 712 to be inserted into the second tubular support shaft 210 and provides enough operational space to enable the second bolt 712 to pass through the through-hole 7221 and be threadedly connected to the first tubular support shaft 110.

Optionally, as shown in FIGS. 8A to 8D, a first embodiment of the first rotational constraint member 810 is configured as a limiting plate 811 fixedly disposed on the first foot platform 100. Correspondingly, the first embodiment of the second rotational constraint member 820 is configured as a limiting groove 821 disposed on the second foot platform 200. The limiting plate 811 cooperates with the limiting groove 821 to restrict the rotation of the first foot platform 100 and the second foot platform 200 relative to each other. It should be noted that the cooperation between the limiting plate 811 and the limiting groove 821 still allows the first foot platform 100 to rotate relative to the second foot platform 200 within a certain angular range, rather than completely preventing the first foot platform 100 from rotating relative to the second foot platform 200.

Specifically, the limiting plate 811 is at least partially located within the limiting groove 821, and when the first foot platform 100 and the second foot platform 200 rotate relative to each other, the limiting plate 811 moves between the two side ends of the limiting groove 821. When the limiting plate 811 moves to abut against either side end of the limiting groove 821, the limiting plate 811 may only move toward the other side end of the limiting groove 821. That is, the rotation of the first foot platform 100 and the second foot platform 200 relative to each other is restricted by the travel range of the limiting plate 811 within the limiting groove 821. For example, during the process of the first foot platform 100 rotating clockwise relative to the second foot platform 200, if the limiting plate 811 abuts against one side end of the limiting groove 821, the first foot platform 100 may not continue to rotate clockwise relative to the second foot platform 200 and may only rotate counterclockwise relative to the second foot platform 200.

In one embodiment, the axial constraint mechanism allows the first tubular support shaft 110 and the second tubular support shaft 210 to rotate 360 degrees relative to each other. That is, the restriction imposed by the axial constraint mechanism on the first tubular support shaft 110 and the second tubular support shaft 210 only prevents or substantially prevents them from moving/sliding relative to each other in the axial direction, but does not restrict their rotation relative to each other.

In one embodiment, as shown in FIGS. 8A to 8D, a third embodiment of the axial constraint mechanism 700 includes a first axial constraint member 710 fixed to the first foot platform 100 and a second axial constraint member 720 correspondingly fixed to the second foot platform 200. The first axial constraint member 710 and the second axial constraint member 720 may both be integrally formed with their respective foot platforms or may be a part of the respective foot platforms. The first axial constraint member 710 may generally be a ring-shaped protrusion (also referred to as a tongue or tab), while the second axial constraint member 720 may generally be a ring-shaped groove (or slot). The ring-shaped protrusion is precisely inserted into the ring-shaped groove, thereby restricting the left and right foot platforms from axial displacement in the left-right direction, and indirectly restricting the left and right tubular support shafts from axial displacement.

At this point, the rotational constraint mechanism 800 includes a first rotational constraint member 810 positioned on the first foot platform 100 and a second rotational constraint member 820 positioned on the second foot platform 200. In other words, the first axial constraint member 710 and the second axial constraint member 720, as well as the first rotational constraint member 810 and the second rotational constraint member 820, are respectively disposed on the first foot platform 100 and the second foot platform 200.

The first axial constraint member 710 and the second axial constraint member 720 are configured to cooperate with each other to restrict axial movement of the first tubular support shaft 110 and the second tubular support shaft 210 relative to each other. The first rotational constraint member 810 and the second rotational constraint member 820 are configured to cooperate with each other to restrict rotation of the first foot platform 100 and the second foot platform 200 relative to each other. Since the first tubular support shaft 110 and the second tubular support shaft 210 are respectively fixed within the first foot platform 100 and the second foot platform 200, the axial constraint mechanism 700 and the rotational constraint mechanism 800 may respectively restrict axial movement and rotation of the first tubular support shaft 110 and the second tubular support shaft 210 relative to each other.

It should be noted that, to achieve the aforementioned two types of restrictions—firstly, restricting axial movement of the left and right support shafts or the left and right foot platforms, and secondly, restricting rotation of the left and right foot platforms—the electric vehicle 10 of the present application may be equipped with the aforementioned rotational constraint mechanism 800 and at least one embodiment of the aforementioned axial constraint mechanism 700.

Optionally, the symmetry axis of the first foot platform 100 in its length direction is collinear with the symmetry axis of the second foot platform 200 in its length direction, allowing the first foot platform 100 and the second foot platform 200 to be symmetrically arranged between the first wheel 300 and the second wheel 400. Thus, when the first tubular support shaft 110 and the second tubular support shaft 210 are centrally disposed within the first foot platform 100 and the second foot platform 200, respectively, the axial direction A of the first tubular support shaft 110 and the axial direction A of the second tubular support shaft 210 are also aligned along the same straight line.

Optionally, as shown in FIGS. 8A to 8D, when the first axial constraint member 710 and the second axial constraint member 720, as well as the first rotational constraint member 810 and the second rotational constraint member 820, are respectively disposed on the first foot platform 100 and the second foot platform 200, the first rotational constraint member 810 includes a limiting plate 811 fixedly disposed on the first foot platform 100, and the second constraint member includes a limiting groove 821 disposed on the second foot platform 200. The limiting groove 821 may include a first side end 8211 and a second side end 8212.

The limiting plate 811 cooperates with the limiting groove 821 to restrict the angle of rotation of the first foot platform 100 and the second foot platform 200 relative to each other, preventing excessive rotation. Specifically, the limiting plate 811 is at least partially located within the limiting groove 821, and when the first foot platform 100 and the second foot platform 200 rotate relative to each other, the limiting plate 811 moves between the two side ends 8211, 8212 of the limiting groove 821. When the limiting plate 811 moves to abut against either side end of the limiting groove 821, the limiting plate 811 may only move toward the other side end of the limiting groove 821, meaning that the rotation of the first foot platform 100 and the second foot platform 200 relative to each other is restricted by the travel range of the limiting plate 811 within the limiting groove 821.

In some embodiments, as shown in FIGS. 8A to 8D, the first axial constraint member 710 is specifically configured as a first engaging portion 713 disposed on the first foot platform 100, and the second axial constraint member 720 is specifically configured as a second engaging portion 723 disposed on the second foot platform 200. The first engaging portion 713 and the second engaging portion 723 cooperate to engage with each other, thereby restricting axial movement of the first tubular support shaft 110 and the second tubular support shaft 210 relative to each other.

Figure 8A:
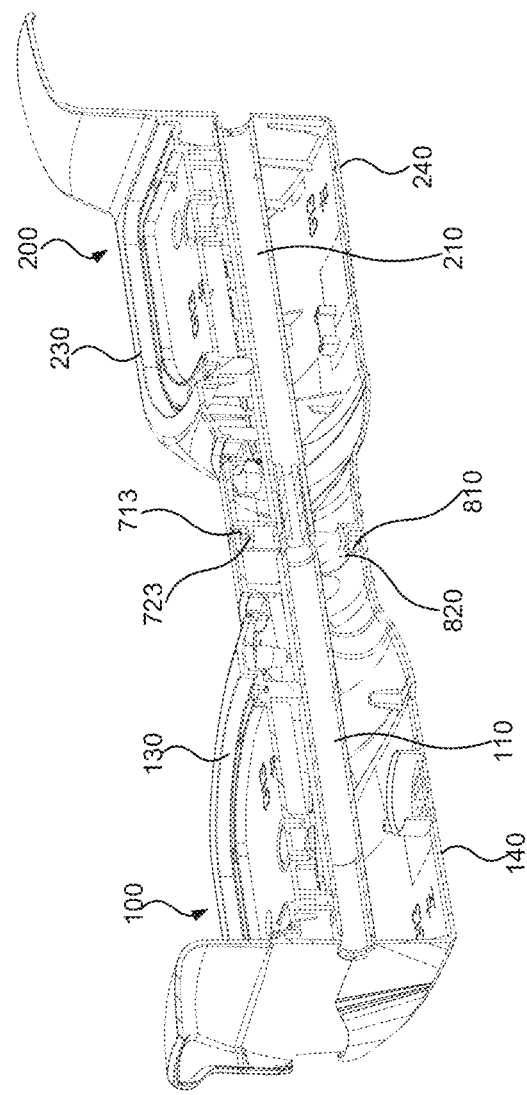
FIG. 8A is a partial cross-sectional schematic diagram of a constraint mechanism of the electric vehicle according to an embodiment of the present application.
Figure 8B:
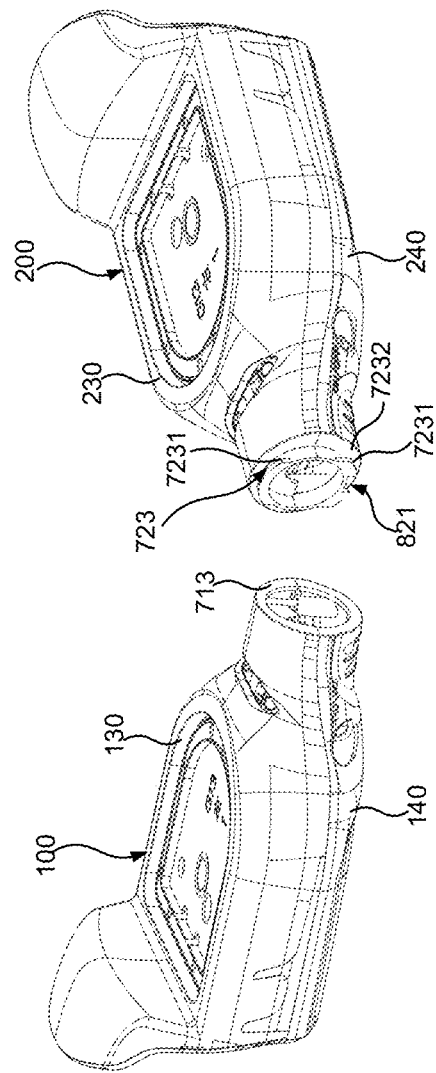
FIG. 8B is a schematic structural diagram of the constraint mechanism of the electric vehicle according to an embodiment of the present application.
Figure 8C:
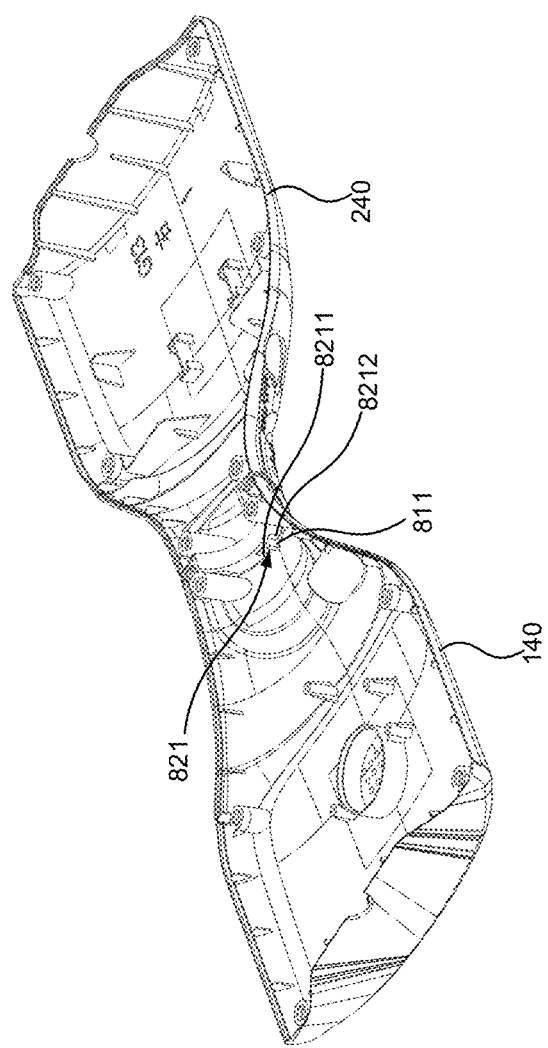
FIG. 8C is another schematic structural diagram of the constraint mechanism of the electric vehicle according to an embodiment of the present application.
Figure 8D:
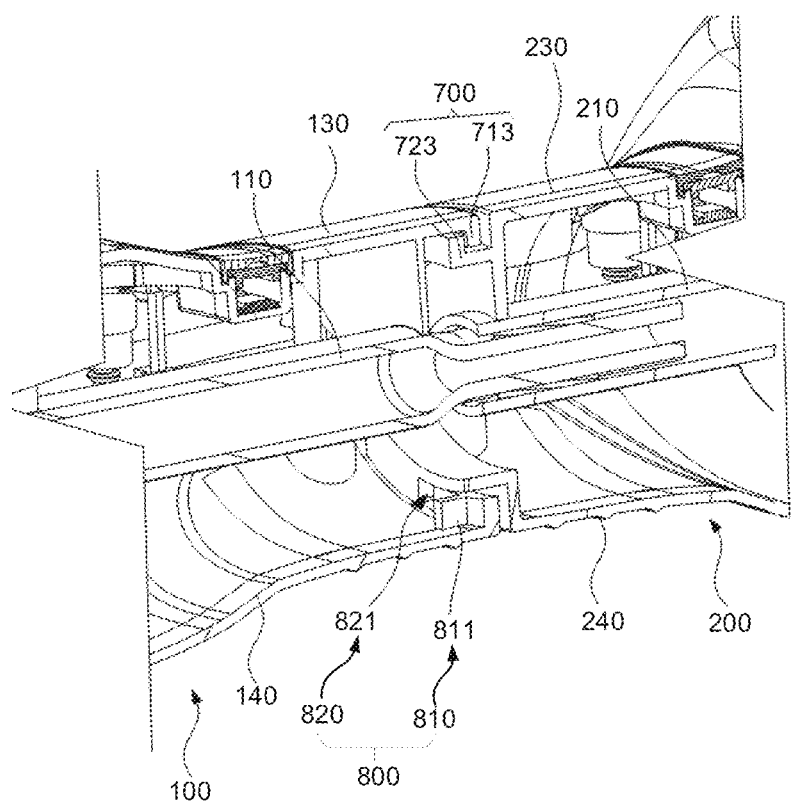
FIG. 8D is another partial cross-sectional schematic diagram of the constraint mechanism of the electric vehicle according to an embodiment of the present application.

Specifically, one embodiment of the second engaging portion 723 is a slot. Referring to FIGS. 8A to 8B, the slot may be partially defined by a first wall 7231 and a second wall 7232 on the inner end of the second foot platform 200. Additionally, the first engaging portion 713 includes an annular engaging plate dimensionally adapted to the slot, and the engaging plate is embedded within the slot to restrict axial movement of the first tubular support shaft 110 and the second tubular support shaft 210 relative to each other. For example, the engaging plate may be an annular plate disposed at the end of the first foot platform 100 away from the first wheel 300, extending inwardly from a side connected to the edge of the end of the first foot platform 100 away from the first wheel 300. The slot may be formed by a connecting portion at the end of the second foot platform 200 away from the second wheel 400. The slot may include multiple slots arranged at intervals; for instance, there may be two slots arranged one above the other, and the engaging plate engages with the two slots, respectively, to achieve an engaging connection between the first foot platform 100 and the second foot platform 200.

Optionally, the axial constraint member allows the first foot platform 100 and the second foot platform 200 to rotate 360 degrees relative to each other. That is, the restriction imposed by the axial constraint member on the first foot platform 100 and the second foot platform 200 only prevents them from moving relative to each other in the axial direction, but the axial constraint member does not restrict their rotation relative to each other.

In one embodiment, the electric vehicle 10 may include a first constraint mechanism and a second constraint mechanism. The first constraint mechanism includes two constraint members respectively disposed on the first foot platform 100 and the second foot platform 200, with the two constraint members of the first constraint mechanism being configured to cooperate with each other to restrict movement of the first foot platform 100 and the second foot platform 200 relative to each other in a first direction. The second constraint mechanism includes two constraint members respectively disposed on the first foot platform 100 and the second foot platform 200, with the two constraint members of the second constraint mechanism being configured to cooperate with each other to restrict movement of the first foot platform 100 and the second foot platform 200 relative to each other in a second direction.

Further, as shown in FIG. 1, the first direction is the lateral or axial direction of the electric vehicle defined by the axis D2, such as direction A. The second direction is the circumferential direction of the electric vehicle, such as the direction d around D2.

Optionally, the first constraint mechanism is configured to still allow the first foot platform 100 and the second foot platform 200 to rotate 360 degrees relative to each other even when the second constraint mechanism is removed. That is, the restrictive constraint imposed by the first constraint mechanism on the first foot platform 100 and the second foot platform 200 only prevents them from moving relative to each other in the axial direction A, without restricting their rotation relative to each other. In other words, when the electric vehicle is provided with only the first constraint mechanism and not the second constraint mechanism, the first foot platform 100 and the second foot platform 200 may rotate 360 degrees relative to each other.

Optionally, as shown in FIGS. 8A to 8D, the two members of the first constraint mechanism are an engaging plate disposed on the first foot platform 100 and a slot disposed on the second foot platform 200. The engaging plate is dimensionally adapted to the slot, and the engaging plate is embedded within the slot, with the engaging plate and the slot cooperating to engage with each other to restrict movement of the first foot platform 100 and the second foot platform 200 relative to each other in the first direction. For example, the engaging plate may be an annular plate disposed at the end of the first foot platform 100 away from the first wheel 300, extending inwardly from a side connected to the edge of the end of the first foot platform 100 away from the first wheel 300. The slot may be formed by a connecting portion at the end of the second foot platform 200 away from the second wheel 400. The slot may include multiple slots arranged at intervals; for instance, there may be two slots arranged one above the other, and the engaging plate engages with the two slots, respectively, to achieve an engaging connection between the first foot platform 100 and the second foot platform 200.

Optionally, the two members of the second constraint mechanism are a limiting plate 811 disposed on the first foot platform 100 and a limiting groove 821 disposed on the second foot platform 200. The limiting plate 811 cooperates with the limiting groove 821 to restrict movement of the first foot platform 100 and the second foot platform 200 relative to each other in the second direction. Specifically, the limiting plate 811 is at least partially located within the limiting groove 821, and when the first foot platform 100 and the second foot platform 200 rotate relative to each other, the limiting plate 811 moves between the two side ends of the limiting groove 821. When the limiting plate 811 moves to abut against either side end of the limiting groove 821, the limiting plate 811 may only move toward the other side end of the limiting groove 821, meaning that the rotation of the first foot platform 100 and the second foot platform 200 relative to each other is restricted by the travel range of the limiting plate 811 within the limiting groove 821.

Optionally, as shown in FIGS. 2 to 4, the electric vehicle further includes a first tubular support shaft 110 fixed to the first foot platform 100 and extending within the first foot platform 100, and a second tubular support shaft 210 fixed to the second foot platform 200 and extending within the second foot platform 200. The inner end of the first tubular support shaft 110 is rotatably connected to the inner end of the second tubular support shaft 210, the outer end of the first tubular support shaft 110 is connected to the first wheel 300, and the outer end of the second tubular support shaft 210 is connected to the second wheel 400. The first tubular support shaft 110 and the second tubular support shaft 210 are coaxially arranged, with the extension direction of the first tubular support shaft 110 or the second tubular support shaft 210 being the first direction, and the rotational direction of the first tubular support shaft 110 and the second tubular support shaft 210 relative to each other being the second direction.

Figure 13:
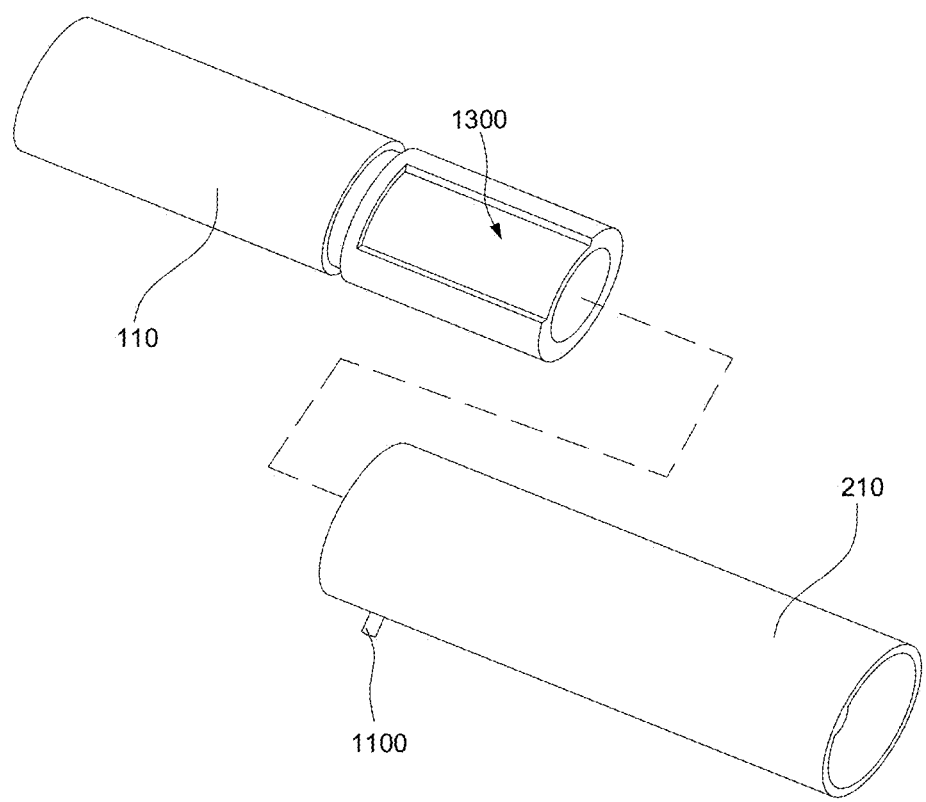
FIG. 13 is a schematic structural diagram of a support assembly of an electric vehicle according to another embodiment of the present application.
Figure 14:
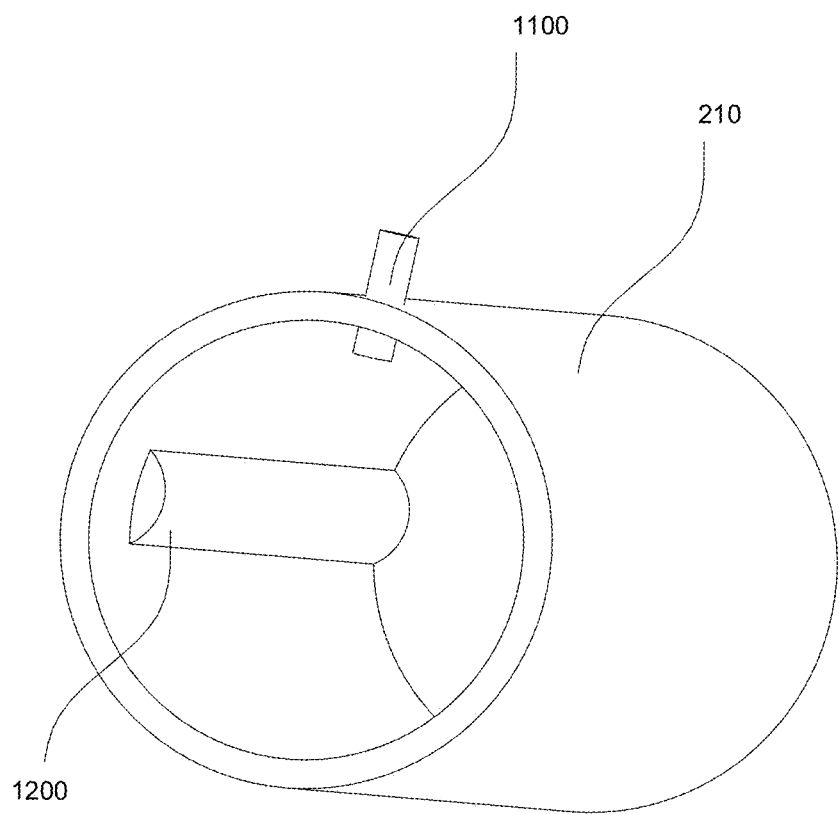
FIG. 14 is a schematic structural diagram of the related structures of a second support shaft in the support assembly of FIG. 13.
Figure 15:
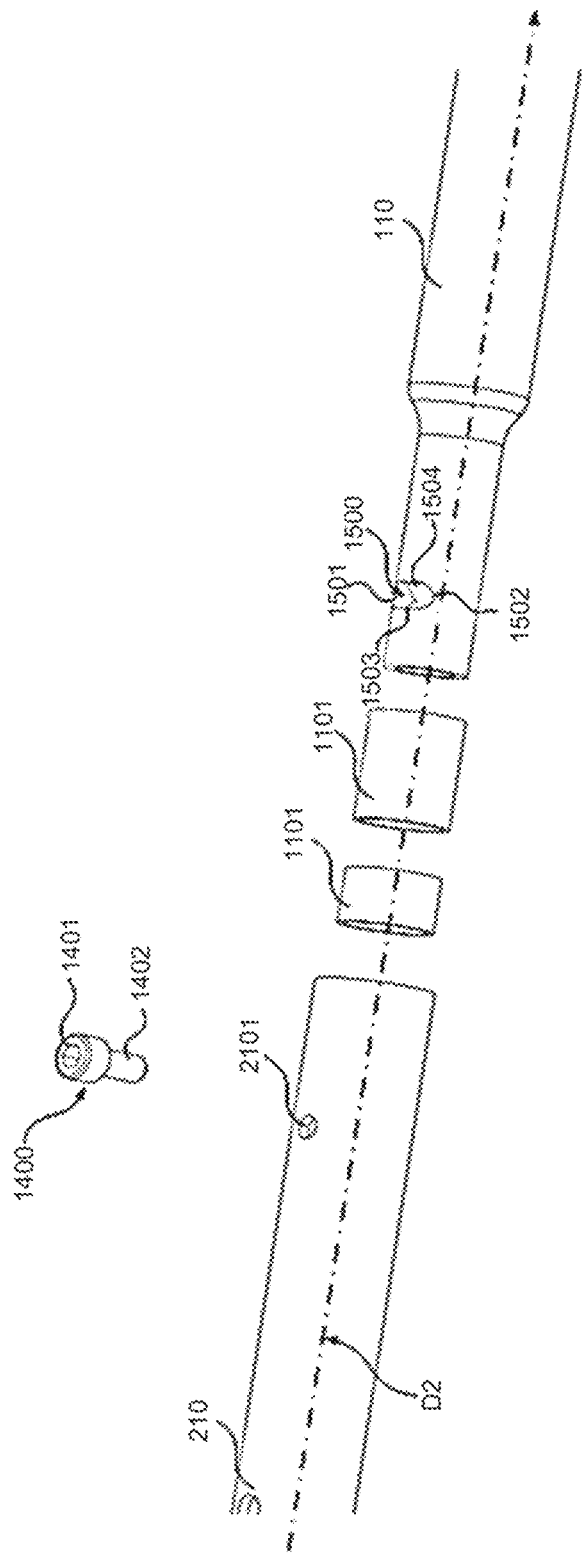
FIG. 15 is a schematic structural diagram of a first embodiment of a single constraint mechanism according to an embodiment of the present application.

Further, as shown in FIGS. 13 and 14, the two members of the first constraint mechanism are a second annular groove 1000 disposed on the outer surface of the first tubular support shaft 110 and a pin 1100 disposed on the second tubular support shaft 210. The pin 1100 and the second annular groove 1000 cooperate with each other to restrict the movement of the first tubular support shaft 110 and the second tubular support shaft 210 relative to each other in the first direction. The second annular groove 1000 refers to an annular groove formed on the outer wall of the first tubular support shaft 110, arranged circumferentially along a section B of the first tubular support shaft 110 that is perpendicular to its axial direction A. Specifically, the pin 1100 is fixedly disposed on the second tubular support shaft 210, and the pin 1100 is located on the portion of the second tubular support shaft 210 that is sleeved over the first tubular support shaft 110. The end of the pin 1100 located inside the second tubular support shaft 210 is embedded within the second annular groove 1000, and the two sides of the pin 1100 respectively abut against the two sidewalls of the second annular groove 1000. Thus, through the cooperation of the pin 1100 and the second annular groove 1000, axial movement of the first tubular support shaft 110 relative to the second tubular support shaft 210 along the axial direction A is restricted, preventing the first tubular support shaft 110 and the second tubular support shaft 210 from moving relative to each other in the axial direction A. However, the pin 1100 may slide along the second annular groove 1000, meaning that the cooperation between the pin 1100 and the second annular groove 1000 does not restrict the rotation of the first tubular support shaft 110 and the second tubular support shaft 210 relative to each other.

Furthermore, the two members of the second constraint mechanism are a limiting portion 1200 disposed on the first tubular support shaft 110 and an angle-limiting groove 1300 disposed on the second tubular support shaft 210. The limiting portion 1200 and the angle-limiting groove 1300 cooperate with each other to restrict movement of the first tubular support shaft 110 and the second tubular support shaft 210 relative to each other in the second direction.

Specifically, as shown in FIGS. 13 and 14, the limiting portion 1200 is disposed on the inner wall of the second tubular support shaft 210. The limiting portion 1200 is configured as a rib extending along the length direction of the second tubular support shaft 210, and the limiting portion 1200 is at least partially located within the angle-limiting groove 1300. The angle-limiting groove 1300 is located on the surface of the first tubular support shaft 110 and extends along the rotational direction of the first tubular support shaft 110 by a certain angle. The angle-limiting groove 1300 has two side ends parallel to the first tubular support shaft 110. When the first tubular support shaft 110 and the second tubular support shaft 210 rotate relative to each other, the limiting portion 1200 moves between the two side ends of the angle-limiting groove 1300. When the limiting portion 1200 moves to abut against either side end of the angle-limiting groove 1300, the limiting portion 1200 may only move toward the other side end of the angle-limiting groove 1300. That is, the rotation of the first tubular support shaft 110 and the second tubular support shaft 210 relative to each other is restricted by the travel range of the limiting portion 1200 within the angle-limiting groove 1300.

Optionally, the inner ends of both the first tubular support shaft 110 and the second tubular support shaft 210 are configured as circular tubular structures, allowing the inner end of the first tubular support shaft 110 to be inserted into the inner end of the second tubular support shaft 210, thereby achieving a rotational connection between the first tubular support shaft 110 and the second tubular support shaft 210.

In some embodiments, the electric vehicle 10 may include only a single constraint mechanism while still simultaneously achieving the aforementioned two types of restriction functions (axial movement restriction and circumferential rotation restriction). The single constraint mechanism may include two constraint members respectively disposed on the first tubular support shaft 110 and the second tubular support shaft 210. These two constraint members may be configured to cooperate with each other to restrict, in the axial direction (e.g., the left-right direction of the electric vehicle 10 defined by D2), relative movement/sliding/loosening of the first tubular support shaft 110 and the second tubular support shaft 210, while also restricting, in the circumferential direction (e.g., the direction d around D2), the angle of relative rotation of the first tubular support shaft 110 and the second tubular support shaft 210. In this way, a single constraint mechanism may achieve restriction of the electric vehicle 10 in both the first direction and the second direction simultaneously, simplifying the structural design and reducing production costs.

In some embodiments, referring to FIGS. 15 to 18, a first embodiment of the single constraint mechanism is illustrated. In this embodiment, the single constraint mechanism includes a fastening bolt 1400 that may be fixed to the second tubular support shaft 210 and an arc-shaped groove 1500 formed at an end of the first tubular support shaft 110. Specifically, the fastening bolt 1400 may be fastened to a threaded hole 2101 formed at the end of the second tubular support shaft 210 through a threaded connection. The fastening bolt 1400 includes two parts: an upper part, which is a hexagonal nut 1401, and a lower part, which is a threaded portion 1402. The overall diameter of the hexagonal nut 1401 is larger than the diameter of the threaded portion 1402. It may be seen that the single constraint mechanism is formed directly on the support assembly composed of the first tubular support shaft 110 and the second tubular support shaft 210. When this support assembly is incorporated into the electric vehicle 10, the electric vehicle 10 automatically includes this single constraint mechanism.

During assembly, when the fastening bolt 1400 is screwed into the threaded hole 2101, since the overall diameter of the hexagonal nut 1401 is larger than the diameter of the threaded portion 1402, the hexagonal nut 1401 remains outside the second tubular support shaft 210. The threaded portion 1402 then enters the interior of the second tubular support shaft 210. Meanwhile, the position of the threaded hole 2101 is aligned with the arc-shaped groove 1500, so when the fastening bolt 1400 is secured to the threaded hole 2101, the threaded portion 1402 is also inserted into the arc-shaped groove 1500. The arc-shaped groove 1500 is an arc-shaped slot with an angle of approximately 30 degrees (relative to the axis of the support shaft 110). The arc-shaped groove 1500 generally has four sidewalls: sidewalls 1503 and 1504, which are substantially opposite each other in the axial direction, and sidewalls 1501 and 1502, which are substantially opposite each other in the circumferential direction. Additionally, the average distance (e.g., linear distance) between sidewalls 1501 and 1502 may be greater than the average distance (e.g., linear distance) between sidewalls 1503 and 1504, making the arc-shaped groove 1500 generally elongated in shape, i.e., longer in the circumferential direction and shorter in the axial direction (e.g., along the direction of D2 as the axial direction). Further, the average distance between sidewalls 1503 and 1504 may be defined as the width dimension of the elongated arc-shaped groove 1500, while sidewalls 1501 and 1502 may be defined as defining the length dimension of the elongated arc-shaped groove 1500.

Here, the arc-shaped groove 1500 may also be referred to as an arcuate hole 1500. Additionally, the fastening bolt 1400 is merely an optional fastener fixed to the second support shaft 210. Other fasteners may include screws, pins, rivets, bolts, spring washers, retaining rings, locking wires, cotter pins, split pins, fastening clips, or any suitable combination of these elements.

More specifically, the distance between sidewalls 1503 and 1504 is slightly greater than the diameter or width of the threaded portion 1402, so that when the threaded portion 1402 is inserted into the arc-shaped groove 1500, the threaded portion 1402 substantially abuts both sidewalls 1503 and 1504 simultaneously. While abutting sidewalls 1503 and 1504, the threaded portion 1402 may also move/slide circumferentially to contact either sidewall 1501 or sidewall 1502. In other words, the four sidewalls of the arc-shaped groove 1500 define a movement space, within which the threaded portion 1402 may move. However, during its movement, the threaded portion 1402 continuously or substantially abuts sidewalls 1503 and 1504 in the axial direction, thereby restricting the axial movement of the threaded portion 1402 through sidewalls 1503 and 1504. This, in turn, indirectly restricts axial movement of the support shaft 210 relative to the support shaft 110.

Additionally, it may be seen that the movement of the threaded portion 1402 primarily refers to its circumferential movement. Thus, when the support shaft 210 and the support shaft 110 rotate relative to each other, the threaded portion 1402 encounters resistance from sidewalls 1501 and 1502 in the circumferential direction, limiting the angle of relative rotation between the support shaft 210 and the support shaft 110. For example, the relative rotation angle may be limited to approximately 15 to 30 degrees.

It may be seen that this single constraint mechanism, primarily composed of the two constraint members—the fastening bolt 1400 and the arc-shaped groove 1500—may simultaneously achieve the aforementioned two types of constraint/restriction effects. That is, it both restricts/prevents axial movement/sliding of the left and right support shafts and limits the angle of relative rotation of the left and right support shafts. It should be noted that, as mentioned earlier, since the support assembly composed of the left and right support shafts is incorporated into the electric vehicle 10, and the left and right foot platforms are respectively fixed to the left and right support shafts, in this embodiment, the single constraint mechanism primarily composed of the fastening bolt 1400 and the arc-shaped groove 1500 also simultaneously constrains/restricts axial relative movement/ loosening of the left and right foot platforms of the electric vehicle 10 and limits the angle of relative rotation of the left and right foot platforms of the electric vehicle 10 in the circumferential direction.

It should be noted that the relative rotation of the left and right support shafts is not completely restricted here because the self-balancing function of the electric vehicle 10 requires the left and right support shafts or the left and right foot platforms to be capable of a certain degree of relative rotation. This is because the left and right foot platforms are fixedly equipped with respective angle sensors, and when the left and right foot platforms rotate relative to each other, the angle sensors on the left and right foot platforms detect differing tilt angle data. This difference in angle data enables the controller of the electric vehicle 10 to control operations such as turning of the electric vehicle 10. However, as mentioned earlier, there are communication lines and power lines, among other cables, connected between the left and right foot platforms, so the angle of relative rotation of the left and right foot platforms needs to be restricted to prevent damage to the cables.

Figure 16:
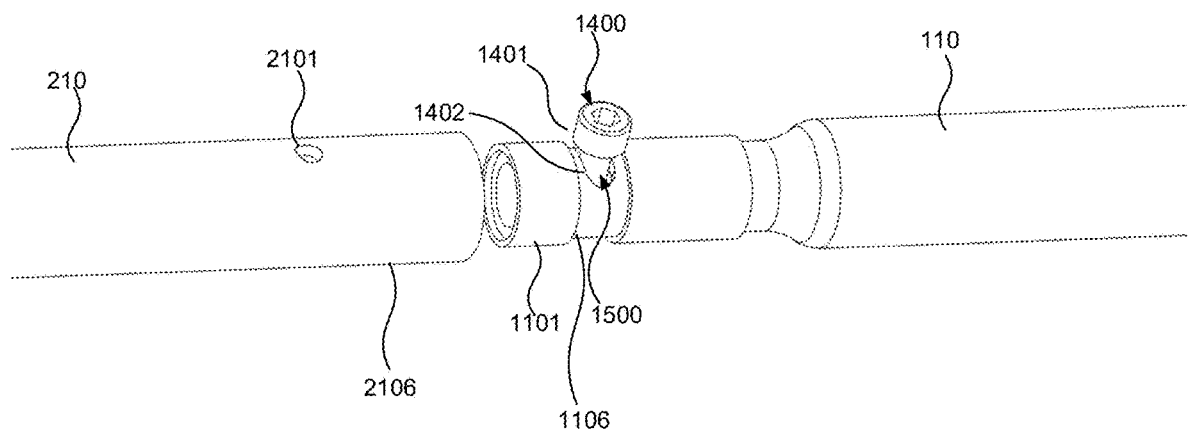
FIG. 16 is another schematic structural diagram of the first embodiment of the single constraint mechanism according to an embodiment of the present application.
Figure 17:
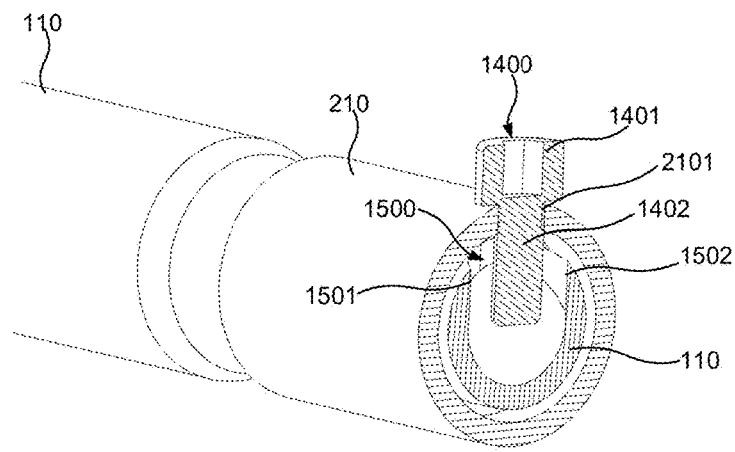
FIG. 17 is a partial cross-sectional schematic diagram of the first embodiment of the single constraint mechanism according to an embodiment of the present application.
Figure 18:
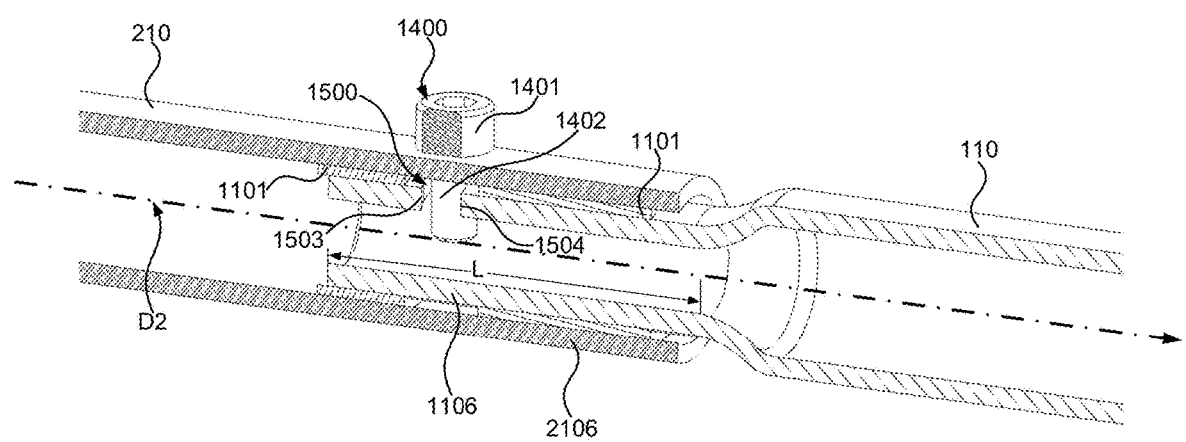
FIG. 18 is a partial cross-sectional schematic diagram from another angle of the first embodiment of the single constraint mechanism according to an embodiment of the present application.

Additionally, as shown in FIGS. 16 and 18, two bushings 1101 of the same size are disposed at intervals at the end of the second tubular support shaft 210. In terms of installation, these two bushings 1101 may be fixed to the inner wall of the end of the second tubular support shaft 210. Specifically, the length of the two bushings 1101 is approximately equal to the length L of the tubular insertion portion of the first support shaft 110 that is inserted into the second tubular support shaft 210, so as to cover this insertion portion as much as possible. The primary function of the two bushings 1101 is to provide lubrication or reduce friction, thereby facilitating relative rotation between the two support shafts. For example, the bushings 1101 may be oil-free bushings, which may have a base material of high-quality low-carbon steel plate (or high-density copper alloy plate, stainless steel plate), with spherical bronze powder sintered in the middle and a surface coated with a mixture of polytetrafluoroethylene (PTFE) and lead, formed through rolling into a sliding bearing (which may be made into flanged bearings, bushings, washers, etc.). Such oil-free bushings feature a low friction coefficient, wear resistance, corrosion resistance, and oil-free lubrication. The use of such oil-free bushings may reduce costs, decrease mechanical size, prevent shaft seizure, and reduce mechanical noise, among other advantages. In some other embodiments, additional lubricating oil may also be applied to the bushings 1101.

Additionally, in terms of dimensional relationships, the inner diameter of the second tubular support shaft 210 is slightly larger than the outer diameter of the two bushings 1101, allowing the two bushings 1101 to be precisely fixed to the inner wall of the second tubular support shaft 210. The inner diameter of the two bushings 1101 is, in turn, slightly larger than the outer diameter of the tubular insertion portion of the first support shaft 110 that is inserted into the second tubular support shaft 210 with a length L. This insertion portion may rotate relative to the fixed bushings 1101, indirectly enabling relative rotation between the two support shafts of the support assembly. Furthermore, when the support assembly is installed in the electric vehicle 10, this rotation of the insertion portion relative to the fixed bushings 1101 also indirectly enables relative rotation between the left and right foot platforms of the electric vehicle 10. Additionally, it may be seen that the length of the inner end 1106 of the first support shaft 110 may be approximately L, meaning that the entire inner end 1106 of the first support shaft 110 is inserted into the inner end 2106 of the second tubular support shaft 210. Further, it may be considered that the length of the inner end 2106 of the second tubular support shaft 210 is also approximately L.

Additionally, in other embodiments, the two bushings 1101 may also be fixed to the outer side of the tubular insertion portion of the first support shaft 110 that is inserted into the second tubular support shaft 210 with a length L, achieving the same effect of reducing friction. Additionally, lubricating bushings may be fixed to both support shafts simultaneously.

Additionally, the dimension of the bushings 1101 extending along the axial direction (e.g., the direction along the axis D2 as the axial direction) is defined as the length dimension of the bushings 1101. It may be clearly seen that the sum of the length dimensions of the two bushings 1101 and the width dimension of the arc-shaped groove 1500 is substantially equal to the length dimension L of the tubular insertion portion formed after the first support shaft 110 is inserted into the second tubular support shaft 210. In this way, the two bushings 1101 may substantially cover the length L of the tubular insertion portion, ensuring optimal lubrication of the insertion portion. It should be noted that the term "substantially" here may be understood as within an error range of plus or minus 25%. For example, if the sum of the length dimensions of the two bushings 1101 and the width dimension of the arc-shaped groove 1500 equals three-quarters of L, the error is −25%. Alternatively, if the sum equals five-quarters of L, the error is +25%.

Figure 19:
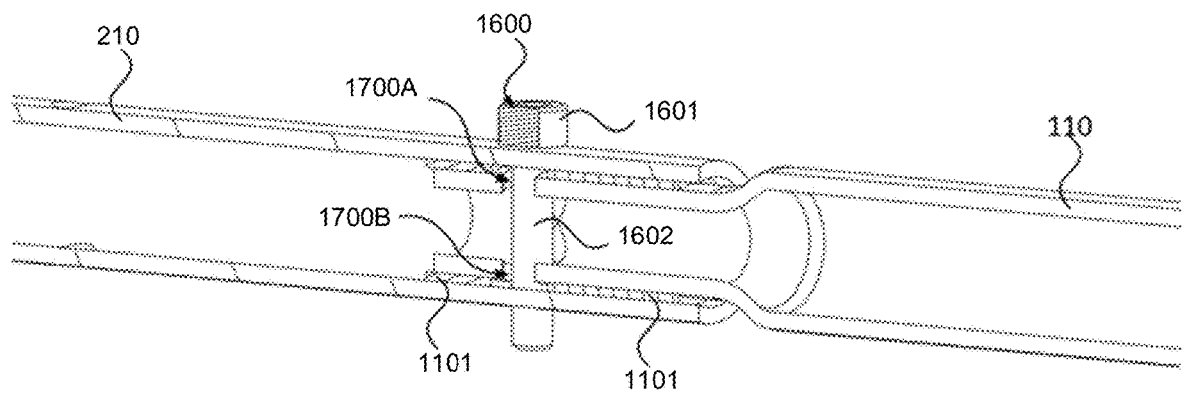
FIG. 19 is a schematic structural diagram of a second embodiment of the single constraint mechanism according to an embodiment of the present application.
Figure 20:
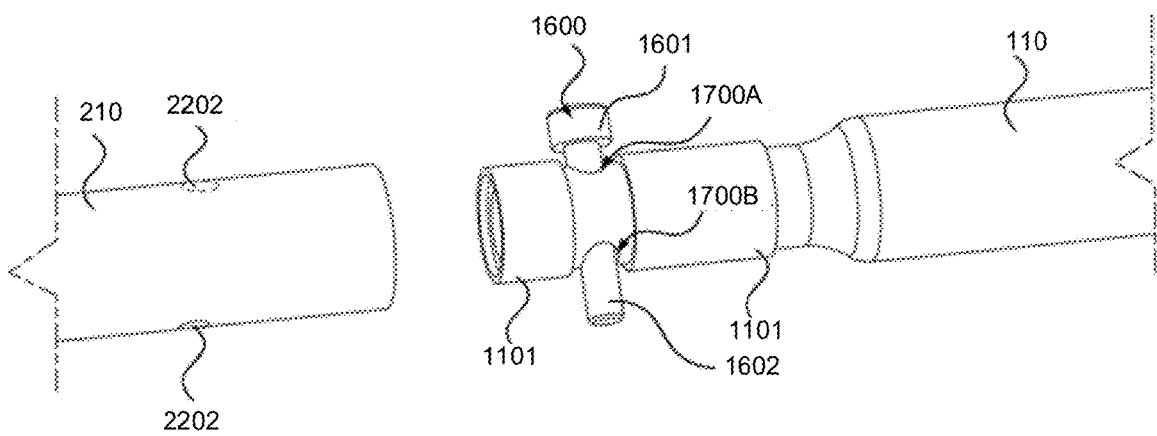
FIG. 20 is another schematic structural diagram of the second embodiment of the single constraint mechanism according to an embodiment of the present application.

Optionally, as shown in FIGS. 19 and 20, a second embodiment of the single constraint mechanism is illustrated. This second embodiment is substantially similar to the first embodiment of the single constraint mechanism, with the primary improvements being the number of arc-shaped grooves and threaded holes, as well as the length of the fastening bolt, compared to the first embodiment. In this second embodiment, the mechanism still primarily consists of fastening bolts and arc-shaped grooves. Specifically, there are two arc-shaped grooves: arc-shaped groove 1700A and arc-shaped groove 1700B, which are oppositely disposed at the end of the second tubular support shaft 210. Additionally, the end of the second tubular support shaft 210 also has two oppositely positioned (e.g., vertically opposite) threaded holes 2202.

Additionally, the threaded portion 1602 of the fastening bolt 1600 is noticeably longer than the threaded portion 1402, allowing the threaded portion 1602 to sequentially pass through, in one direction (e.g., from top to bottom), the first threaded hole 2202, the first arc-shaped groove 1700A, the second arc-shaped groove 1700B, and the second threaded hole 2202. The two threaded holes 2202 have the same specifications and are vertically aligned, meaning that both may secure the fastening bolt 1600 to the second tubular support shaft 210 through threaded engagement with the threaded portion 1602. Additionally, the arc-shaped grooves 1700A and 1700B have the same specifications and are vertically aligned. Similar to the previous description, the threaded portion 1602 may move within both arc-shaped grooves simultaneously, and the threaded portion 1602 substantially continuously abuts the axial sidewalls of these two arc-shaped grooves in the axial direction. Consequently, axial movement/sliding of the second tubular support shaft 210 relative to the first tubular support shaft 110 is prohibited. Furthermore, these two arc-shaped grooves are also elongated in shape, being longer in the circumferential direction and shorter in the axial direction. The threaded portion 1602 may move circumferentially within the area defined by the two elongated arc-shaped grooves, with the result being that the rotation angle of the second tubular support shaft 210 relative to the first tubular support shaft 110 is restricted, preventing the two support shafts from rotating 360 degrees. Ultimately, this limits the relative rotation angle of the two support shafts to within 15 to 30 degrees.

It may be seen that in this second embodiment of the single constraint mechanism, the threaded portion 1602 effectively passes through the mutually inserted end portions of both the second tubular support shaft 210 and the first tubular support shaft 110 simultaneously. Compared to the first embodiment of the single constraint mechanism, the structure of this second embodiment may more securely fix the fastening bolt 1600, preventing it from loosening due to forces encountered during the daily use of the electric vehicle 10.

The embodiments described above in this application, as well as the technical features of each embodiment, may be reasonably combined to form similar or other technical solutions, provided there is no apparent conflict. For the sake of brevity, not all possible combinations of the various technical features in the above embodiments have been described. However, as long as there is no contradiction in the combination of these technical features, such combinations should be considered within the scope of this specification.

The embodiments described above merely represent several implementations of the present application, with their descriptions being relatively specific and detailed, but they should not be construed as limiting the scope of the patent application. It should be noted that, for those skilled in the art, various modifications and improvements may be made without departing from the concept of the present application, and these modifications and improvements fall within the scope of protection of the present application. Therefore, the scope of protection of the patent application shall be determined by the appended claims.

What is claim is:

1. An electric vehicle comprising:
a first foot platform configured to support a first foot of a rider;
a second foot platform configured to support a second foot of the rider, wherein the first foot platform is rotatable relative to the second foot platform;
a first wheel connected to an outer side of the first foot platform and including a first motor;
a second wheel connected to an outer side of the second foot platform and including a second motor, wherein the outer side of the first foot platform and the outer side of the second foot platform form opposite sides of the electric vehicle;
a first tubular support shaft fixed to and extending within the first foot platform;
a second tubular support shaft fixed to and extending within the second foot platform, wherein the first tubular support shaft is rotatably connected to the second tubular support shaft;
a first sensor disposed on the first foot platform and configured to detect rotation of the first foot platform and generate a first sensing signal;
a second sensor disposed on the second foot platform and configured to detect rotation of the second foot platform and generate a second sensing signal;
at least one controller configured to control the first motor to drive the first wheel based on the first sensing signal and to control the second motor to drive the second wheel based on the second sensing signal;
a power source configured to supply power to the electric vehicle;
an axial constraint mechanism including a first axial constraint member disposed on the first tubular support shaft and a second axial constraint member disposed on the second tubular support shaft, wherein the first axial constraint member and the second axial constraint member are configured to cooperate to restrict axial movement between the first tubular support shaft and the second tubular support shaft; and
a rotational constraint mechanism including a first rotational constraint member disposed on the first foot platform and a second rotational constraint member disposed on the second foot platform, wherein the first rotational constraint member and the second rotational constraint member are configured to cooperate to limit a relative rotation angle between the first foot platform and the second foot platform.

2. The electric vehicle of claim 1, wherein:
the first tubular support shaft is centrally fixed in the middle of the first foot platform; and
the second tubular support shaft is centrally fixed in the middle of the second foot platform.

3. The electric vehicle of claim 1, wherein:
each of the first tubular support shaft and the second tubular support shaft has a tubular structure; and
an inner end of the first tubular support shaft is inserted into an inner end of the second tubular support shaft to enable rotational connection between the first tubular support shaft and the second tubular support shaft.

4. The electric vehicle of claim 3, further comprising:
a bushing sleeved on the inner end of the first tubular support shaft, the bushing is disposed between the first tubular support shaft and the second tubular support shaft.

5. The electric vehicle of claim 1, wherein:
the first axial constraint member includes a first annular groove disposed on an outer surface of the first tubular support shaft;
the second axial constraint member includes a first bolt disposed on the second tubular support shaft; and
the first bolt cooperates with the first annular groove to restrict axial movement between the first tubular support shaft and the second tubular support shaft.

6. The electric vehicle of claim 5, wherein the first bolt is embedded in the first annular groove and is configured to abut against two sidewalls of the first annular groove to restrict axial movement between the first tubular support shaft and the second tubular support shaft.

7. The electric vehicle of claim 1, wherein:
the first axial constraint member includes a second bolt;
the second axial constraint member includes a connecting plate disposed within the second tubular support shaft; and
the connecting plate cooperates with the second bolt to restrict axial movement between the first tubular support shaft and the second tubular support shaft.

8. The electric vehicle of claim 7, wherein:
an inner end of the first tubular support shaft is provided with a threaded hole;
the connecting plate has a through-hole;
the second bolt passes through the through-hole and is threadedly connected to the first tubular support shaft via the threaded hole; and
two sides of the connecting plate are configured to respectively abut against a head of the second bolt and the inner end of the first tubular support shaft to restrict axial movement between the first tubular support shaft and the second tubular support shaft.

9. The electric vehicle of claim 7, wherein the second tubular support shaft has a notch corresponding to the connecting plate.

10. The electric vehicle of claim 1, wherein:
the first rotational constraint member includes a limiting plate disposed on the first foot platform;
the second rotational constraint member includes a limiting groove disposed on the second foot platform; and
the limiting plate cooperates with the limiting groove to limit a relative rotation angle between the first foot platform and the second foot platform.

11. The electric vehicle of claim 10, wherein the limiting plate is restricted to move between two sidewalls of the limiting groove to limit a maximum relative rotation angle between the first foot platform and the second foot platform.

12. The electric vehicle of claim 1, wherein the axial constraint mechanism allows the first tubular support shaft and the second tubular support shaft to rotate 360 degrees relative to each other.

13. An electric vehicle comprising:
a first foot platform configured to support a first foot of a rider;
a second foot platform configured to support a second foot of the rider;
a first wheel connected to the first foot platform and including a first motor;
a second wheel connected to the second foot platform and including a second motor;
a first sensor disposed on the first foot platform and configured to detect rotation of the first foot platform and generate a first sensing signal;
a second sensor disposed on the second foot platform and configured to detect rotation of the second foot platform and generate a second sensing signal;
at least one controller configured to control the first motor to drive the first wheel based on the first sensing signal, and to control the second motor to drive the second wheel based on the second sensing signal;
a power source configured to supply power to the electric vehicle;
a first tubular support shaft;
a second tubular support shaft;
at least one hole formed on the first tubular support shaft; and
at least one fastener fixed to the second tubular support shaft;
wherein an inner end of the first tubular support shaft is rotatably inserted into an inner end of the second tubular support shaft to enable rotational connection between the first tubular support shaft and the second tubular support shaft; and
the at least one fastener is configured to move within the at least one hole to at least limit a relative rotation angle between the first tubular support shaft and the second tubular support shaft.

14. The electric vehicle of claim 13, further comprising:
a bushing fixed to at least one of the first tubular support shaft and the second tubular support shaft.

15. An electric vehicle comprising:
a first foot platform configured to support a first foot of a rider;
a second foot platform configured to support a second foot of the rider;
a first wheel connected to the first foot platform and including a first motor;
a second wheel connected to the second foot platform and including a second motor;
a first sensor disposed on the first foot platform and configured to detect rotation of the first foot platform and generate a first sensing signal;
a second sensor disposed on the second foot platform and configured to detect rotation of the second foot platform and generate a second sensing signal;
a first controller disposed on the first foot platform and configured to control the first motor to drive the first wheel based on the first sensing signal;
a second controller disposed on the second foot platform and configured to control the second motor to drive the second wheel based on the second sensing signal;
a power source configured to supply power to the electric vehicle;
a first tubular support shaft;
a second tubular support shaft;
an arcuate groove formed on the first tubular support shaft; and
a fastening bolt detachably fixed to the second tubular support shaft;
wherein an inner end of the first tubular support shaft is rotatably inserted into an inner end of the second tubular support shaft to enable rotational connection between the first tubular support shaft and the second tubular support shaft; and
the fastening bolt is configured to move within the arcuate groove to limit a relative rotation angle between the first tubular support shaft and the second tubular support shaft.

16. The electric vehicle of claim 15, further comprising:
two bushings are fixed at intervals to an inner wall of the second tubular support shaft.

17. The electric vehicle of claim 16, wherein a sum of length dimensions of the two bushings and a width dimension of the arcuate groove along a first direction is substantially equal to a length of a tubular insertion portion formed by the first tubular support shaft inserted into the second tubular support shaft.

18. An electric vehicle comprising:
a first foot platform configured to support a first foot of a rider;
a second foot platform configured to support a second foot of the rider, wherein the first foot platform is rotatable relative to the second foot platform;
a first wheel connected to the first foot platform and including a first motor;
a second wheel connected to the second foot platform and including a second motor;
a first sensor disposed on the first foot platform and configured to detect rotation of the first foot platform and generate a first sensing signal;
a second sensor disposed on the second foot platform and configured to detect rotation of the second foot platform and generate a second sensing signal;

at least one controller configured to control the first motor to drive the first wheel based on the first sensing signal, and further configured to control the second motor to drive the second wheel based on the second sensing signal;

a power source configured to supply power to the electric vehicle;

a first constraint mechanism including two constraint members disposed respectively on the first foot platform and the second foot platform, the two constraint members of the first constraint mechanism being configured to cooperate with each other to restrict relative movement between the first foot platform and the second foot platform in a first direction; and a second constraint mechanism including two constraint members disposed respectively on the first foot platform and the second foot platform, the two constraint members of the second constraint mechanism being configured to cooperate with each other to restrict relative movement between the first foot platform and the second foot platform in a second direction;

the second direction around the first direction.

* * * * *